United States Patent [19]

Vassiliadis

[11] Patent Number: 4,942,548
[45] Date of Patent: Jul. 17, 1990

[54] PARALLEL ADDER HAVING REMOVED DEPENDENCIES

[75] Inventor: Stamatis Vassiliadis, Vestal, N.Y.

[73] Assignee: International Business Machines Corporation, Armonk, N.Y.

[21] Appl. No.: 66,364

[22] Filed: Jun. 25, 1987

[51] Int. Cl.$^5$ .............................................. G06F 7/50
[52] U.S. Cl. ................................................... 364/784
[58] Field of Search .............................. 364/784–787

[56] References Cited

U.S. PATENT DOCUMENTS

| | | | |
|---|---|---|---|
| 4,138,731 | 2/1979 | Kamimoto et al. | 364/787 |
| 4,157,590 | 6/1979 | Grice et al. | 364/787 |
| 4,348,736 | 9/1982 | Weinberger | 364/787 |
| 4,584,661 | 4/1986 | Grundland | 364/787 |
| 4,737,926 | 4/1988 | Vo et al. | 364/787 |

FOREIGN PATENT DOCUMENTS 2011669  7/1979  United Kingdom ................ 364/787

OTHER PUBLICATIONS

Ling, "High-Speed Binary Adder", *IBM J. Res. Develop.*, vol. #25, #3, pp. 156–166, May 1987.

Hwang, Kai, Computer Arithmetic Prinicples, Architecture, and Design, pp. 84–91.

Weinberger, "High-Speed Programmable Logic Array Adders", *IBM Journal of Research and Development*, vol. 23, #2, pp. 163–178, Mar. 1979.

Ling, "High Speed Binary Adders", *IBM Technical Disclosure Bulletin*, vol. 24, #1B, pp. 495–506, Jun. 1981.

Weinberger, "High-Speed Binary Adder", *IBM Technical Disclosure Bulletin*, vol. 24, #8, pp. 4393–4398, Jan. 1982.

*Primary Examiner*—Gary V. Harkcom
*Assistant Examiner*—Dale M. Shaw
*Attorney, Agent, or Firm*—David S. Romney; Mark Levy

[57] ABSTRACT

A methodology to perform binary addition. An operand A and an operand B are presented as input and an operation is performed that respects the laws of the binary addition. The operation is performed with the use of pseudo generate signals, pseudo transmit signals, pseudo half sum signals, pseudo transmit half sum signals, a new-carry and SUM equations. The SUM equation is described for ripple or parallel configurations. All quantities can be used on single bit boundaries, or extensively for any chosen grouping of bits to accommodate chosen technology or grouping so as to facilitate the design and to increase the performance of hardware-implemented adders under the constraints of a varied technology book set. The invention also describes the implementation of a 32-bit adder that requires no more than three logic stages of delay, using a technology that allows up to 3×8 AND-OR books. Its design is achieved with the use of a SUM equation described by the general scheme of the addition and auxiliary functions that reduce the book size needed for the implementation of the sum.

48 Claims, 8 Drawing Sheets

PARALLEL ADDER HAVING REMOVED DEPENDENCIES

BACKGROUND OF THE INVENTION

The present invention relates to the design of arithmetic units in digital computer systems and, more particularly, to the design of binary adders.

Arithmetic operations in computer systems, such as addition and subtraction, are performed on two operands, each having a given number of bits (e.g., N bits), the operations yielding an N-bit result.

Because a great number of arithmetic operations can be performed by high speed digital computers in a relatively short time interval (e.g., one second), the time required to perform any one of such operations can become a significant factor when multiplied by the number of operations per second. Designers are therefore obliged to invent ever faster formulations to perform arithmetic operations.

Conventional addition functions, such as carry (or borrow) generate and carry propagate, are described in COMPUTER ARTITHMETIC PRINCIPLES, ARCHITECTURE, AND DESIGN, by Kai Hwang. These functions generally depend on two paths: one that produces carries into a bit position and one that produces a half-sum. The conventional recursive formulas are shown below and are derived as follows:

Adder Equations $A, B = $ OPERANDS $\quad A_0 \ldots A_i \ldots A_n$
$\qquad\qquad\qquad\qquad B_0 \ldots B_i \ldots B_n$
$S = $ RESULT $\qquad\quad \overline{S_0 \ldots S_i \ldots S_n}$ For every position i a carry is received from position i+1 to be added with $A_i$, $B_i$. In essence:

$$\begin{array}{r} A_i \\ B_i \\ + \; C_{i+1} \\ \hline C_i S_i \end{array}$$

where $C_{i+1}$ is the carry bit from position i+1.

The maximum value for each individual operand is one. Therefore, MAX $[A_i + B_i + C_{i+1}] = 1 + 1 + 1 = 3$. Since two bits are required to represent the number three (11, in binary code), a carry to the next position is generated.

All combinations are shown below in Table 1.

TABLE I

| | $C_{i+1}$ | $A_i$ | $B_i$ | $S_i$ | $C_i$ |
|---|---|---|---|---|---|
| (1) | 0 | 0 | 0 | 0 | 0 |
| (2) | 0 | 0 | 1 | 1 | 0 |
| (3) | 0 | 1 | 0 | 1 | 0 |
| (4) | 0 | 1 | 1 | 0 | 1 |
| (5) | 1 | 0 | 0 | 1 | 0 |
| (6) | 1 | 0 | 1 | 0 | 1 |
| (7) | 1 | 1 | 0 | 0 | 1 |
| (8) | 1 | 1 | 1 | 1 | 1 |

$0 + 0 + 0 = 0 => S_i = 0, C_i = 0$
$1 + 1 + 0 = 2 => S_i = 0, C_i = 1$

The Boolean Equations Of Table 1

$S_i = 1$ if and only if the following holds true:
$\qquad S_i = (2)$ or (3) or (5) or (8)

$(2) = C_{i+1}'A_i'B_i$ where the expression N' indicates the negation of N hereinbelow.

$(2) = 1$ if and only if $C_{i+1} = 0$, $A_i = 0$, and $B_i = 1$ $(3) = C_{i+1}'A_iB_i'$ $(5) = C_{i+1}A_i'B_i'$ $(8) = C_{i+1}A_iB_i$ Thus,
$S_i = C_{i+1}'A_i'B_i + C_{i+1}'A_iB_i' + C_{i+1}A_i'B_i' + C_{i+1}A_iB_i$ $S_i = C_{i+1}'[A_i'B_i + A_iB_i'] + C_{i+1}[A_i'B_i' + A_iB_i]$ $A_i'B_i + A_iB_i' = $ Exclusive-OR ($\forall$)

$A_i'B_i' + A_iB_i = $ Exclusive-OR-Invert

Thus, $S_i = C_{i+1}'[A_i \forall B_i] + C_{i+1}[A_i \forall B_i]$

Similarly, $S_i = C_{i+1} \forall A_i \forall B_i$ $A_i \forall B_i$ is defined as half sum $H_i$.

$S_i = H_i \forall C_{i+1}$ $C_i = (4)$ or (6) or (7) or (8)

$C_i = C_{i+1}'A_iB_i + C_{i+1}A_i'B_i + C_{i+1}A_iB_i' + C_{i+1}A_iB_i$

Adding the same term as one that previously appeared does not change a Boolean equation. Thus, $C_i = C_{i+1}'A_iB_i + C_{i+1}A_i'B_i + C_{i+1}A_iB_i' + C_{i+1}A_iB_i + C_{i+1}A_iB_i$ $C_i = [C_{i+1}' + C_{i+1}]A_iB_i + C_{i+1}[A_i'B_i + A_iB_i' + A_iB_i]$ But, $A_i'B_i + A_iB_i' + A_iB_i = B_i[A_i' + A_i] + A_iB_i'$
$\qquad B_i + A_iB_i' = $ (with a Boolean equivalence) $[B_i + A_i]$
$\qquad C_{i+1}' + C_{i+1} = 1$.

Thus, $C_i = A_iB_i + [A_i + B_i]C_{i+1}$ $A_iB_i$ is defined as $G_i$; $A_i + B_i$ is defined as $T_i$.
Thus, $C_i = G_i + T_iC_{i+1}$ $SUM_i = H_i \forall C_{i+1}$ $C_i = G_i + T_iC_{i+1}$ where $\forall$ is the Exclusive OR; $SUM_i$ is the SUM of bit i.

Executing this formulation is relatively time consuming because it requires the half sum value $H_i$, which is computed immediately, and the term $C_{i+1}$, which depends on the calculation of a previous carry ($C_{i+2}$).

A better solution, using the same formulation, can be achieved using the carry-look-ahead (CLA) technique. This technique is used to speed up carry propagation in an adder. Carries that are applied to all of the bit positions of an adder can be generated simultaneously by means of additional logic circuitry.

While improvements can result using the CLA technique, a carry operation still lies in the critical path. The SUM can be computed either implicitly (i.e., by producing a carry propagated to a previous group of bits and then using a formulation for the SUM that involves that carry) or explicitly (i.e., by producing the carry into bit position that is being considered and using an exclusive OR operation to produce the SUM). Implicit calculations produce the SUM one stage after producing a carry into a group, and explicit calculations produce the SUM two stages after the production of a carry into a group.

Accordingly, delays in the critical path are due to the production of carries. Moreover, the SUM requires at least one stage after the creation of the appropriate carry for either implicit or explicit calculation.

An improved formulation for the SUM is disclosed in the IBM Journal of Research and Development, Vol. 25, No. 3, pp. 156–166, titled "High-Speed Binary Adder" by Huey Ling. This recursive formulation is described as follows:

$$SUM_i = H_i T_i' + T_i H_i' + K_i H_{i+1} T_{i+1}$$
$$= (H_i \oplus T_i) + K_i H_{i+1} T_{i+1}$$

with the following definitions:

$$H_i = K_i + T_{i+1} H_{i+1}; \quad K_i = A_i B_i; \quad T_i = A_i + B_i.$$

The term $H_i$ is not always defined. That is, there are cases in which no value can be attributed to $H_i$. Thus $SUM_i$ in those cases has no meaning and cannot be calculated.

When operands A and B are both 32 bits wide, enumerated from 0 to 31 (0 being the most significant bit), $$H_{31} = K_{31} + T_{32} H_{32}$$

In this case, $T_{32} = A_{32} + B_{32}$, implying that $T_{32}$ is outside of the scope of the addition and has no meaning. Consequently $H_{31}$ and the SUMs 30 and 31 cannot be computed because they are described as follows:

$$SUM_{31} = H_{31} T_{31}' + T_{31} H_{31}' + K_{31} H_{32} T_{32}$$

$$SUM_{30} = H_{30} T_{30}' + T_{30} H_{30}' + K_{30} H_{31} T_{31}$$

It can also be observed that $SUM_{31}$ contains $H_{32}$ which is equal to:

$$H_{32} = K_{32} + T_{33} H_{33}$$

None of these parameters is defined, so $H_{32}$ cannot be computed.

Moreover, when a CLA operation occurs, substituting i=30, 29 and 28 results respectively in:

$$H_{30} = K_{30} + T_{31} H_{31} = K_{30} + T_{31} K_{31} + T_{31} T_{31} H_{32}$$

$$H_{29} = K_{29} + T_{30} H_{30} = K_{29} + T_{30} K_{30} + T_{30} T_{31} K_{31} + T_{30} T_{31} T_{32} H_{32}$$

(1)
$$H_{28} = K_{28} + T_{29} H_{29} = K_{28} + T_{29} K_{29} + T_{29} T_{30} K_{30} + T_{29} T_{30} T_{31} T_{31} + T_{29} T_{30} T_{31} T_{32} H_{32}$$

Despite the fact that the aforementioned equations contain quantities with no meaning, which implies that $H_{28}$ is undefined as are the SUMs depending thereon; in the aforementioned article by Ling, $H_{28}$ is defined and repeatedly used as follows:

(2)
$$H_{28} = K_{28} + T_{29} H_{29} = K_{28} + T_{29} K_{29} + T_{29} T_{30} K_{30} + T_{29} T_{30} t_{31} K_{31} T_{29} T_{30} T_{31} T_{32} K_{32}$$

Equation (1) is equivalent to equation (2) if and only if:

$$T_{29} T_{30} T_{31} T_{32} T_{33} H_{33} = 0.$$

This is because:

$H_{32} = K_{32} + T_{33} H_{33}$ and equation (1) can be written as:

$$\begin{aligned} H_{28} &= K_{28} + T_{29} H_{29} \\ &= K_{28} + T_{29} K_{29} + T_{29} T_{30} K_{30} + T_{29} T_{30} T_{31} K_{31} + \\ & \quad T_{29} T_{30} T_{31} T_{32} K_{32} + T_{29} T_{30} T_{31} T_{33} H_{33} \end{aligned}$$

In conclusion, $T_{29} T_{30} T_{31} T_{32} T_{33} H_{33}$ is undefined, contains parameters not within the scope of the addition, and has no meaning. Consequently this term cannot be assumed ever to be identical to binary 0.

The CLA technique can produce redundancies. Specifically, all $T_i K_i$ are equal to $K_i$ and should have been eliminated. Similar conclusions can be applied to any length addition.

SUMMARY OF THE INVENTION

It is a primary object of the present invention to provide a new set of equations equivalent to the addition operation that can be implemented to any chosen technology.

It is a further object of the present invention to provide apparatus for addition that can be implemented in carry-look-ahead circuitry, thus providing adders that are capable of operating in parallel fashion.

It is a further object of the invention to create a parallel adder with three logic stages of delay using a maximum 3×8 AND-OR book, where book is defined as one or more cells comprising logical devices capable of computing Boolean expressions. In particular, 3×8 indicates a three-way AND gate and eight-way OR gate configuration.

The present invention reduces the delay necessary to execute addition in computer arithmetic units. It is also within the scope of the invention to propose SUM equations that are proven to respect the equivalence with the addition operation, guaranteeing that the recursive formulas are operational. To reduce the delay necessary to calculate the SUM, critical quantities are generated that require less delay than do carries. The SUM is produced in such a way as to require Boolean expressions that can be implemented with the same delay as, or less delay than, delays for the conventional formulations.

The formulation of the function in accordance with the present invention is different than the formulation in the prior art. Because pseudo quantities and new-carries can be implemented faster than the carries described by conventional formulations, the new formulation of the function results in faster execution time and preserves the equivalence with the addition. Compared to the aforementioned paper by Ling, the present invention SUM equation contains less terms. Thus, when implemented, it requires smaller technology books, resulting in reduced delay. The new carry is defined for all natural numbers, implying that there are no regions of undefined quantities. Thus the SUM always has a correct addition value. The equations of the present invention produce a new-carry for look ahead with no redundancies to be excluded. Pseudo quantities are defined to improve delay in a CLA scheme, combined with group look ahead to produce defined new-carries. Such pseudo quantities contain no redundancies, so there is no need to delete unwanted quantities, an operation that tends to penalize implementation.

New recursive equations are provided herein for the addition function. The implementation of the equations in any chosen technology can be achieved with ripple carry or with any parallel technique. The adder circuitry resulting from implementation comprises pseudo generate signals, pseudo transmit signals, pseudo half sum signals and pseudo transmit half sum signals. The new-carry is defined for any width addition and represents a binary value and a SUM equation described for ripple or parallel configurations.

All quantities can be used on single bit boundaries, or extensively for any chosen grouping of bits. All equations can accommodate any chosen technology or grouping so as to facilitate the design and to increase the performance of hardware-implemented adders under the constraints of a varied technology book set.

Two operands of a chosen length N are applied to the adder and the end result is the correct binary addition represented in an N-bit result string. In a ripple carry implemented adder, for every bit position, a pseudo transmit half sum signal is created as is a pseudo half sum signal, a new-carry signal and its complement. The ripple new-carry is created with the pseudo generate, pseudo transmit and the previous new-carry.

In parallel adders, depending on technology, a SUM equation is chosen that is convenient for the technology constraints. Depending on the width of the adder, a convenient grouping is imposed. For the chosen grouping and the SUM equations, bit pseudo transmit half sums and pseudo half sums are implemented, in addition to group pseudo transit and pseudo generate signals as dictated by the specified SUM and grouping. For every group, the new-carry is derived and implemented, requiring its own group pseudo generate, pseudo transmit signals and a new-carry of some previous group.

With respect to the design of a 32-bit parallel adder, a choice is made to change the equations to respect the addition process while shortening the critical path by means of a set of auxiliary functions that take into account the technology constraints. Even with technology constraints of a 3×8 AND-OR maximum book, the altered equations produce a maximum delay of only three logic stages.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

For ease of comprehension the FIGURES appended hereto are described by Boolean expressions. The symbols involved in the equations are defined hereinbelow. It is assumed that bit positions are labeled 0 for the most significant bit and r for the least significant bit such that $r \geq 0$. The subscripts run high order to low. The variables i, m, n belong to the natural numbers and $n+1$ is the width of the addition.

The invention reduces overall delay by creating pseudo quantities and new-carries ($PS_i$), that are not equivalent or equal to the carries. $PS_i$ requires less hardware and less delay than does the implementation of carries. New SUM equations have been created that maintain equivalence with the addition function by means of pseudo quantities, a new-carry term ($PS_i$), defined properly for any width addition, and Boolean equations representing the SUM. The new SUM equations can be implemented with only one stage of delay after production of the new-carries.

Notation

1. N=natural numbers
2. $\veebar$=exclusive OR
3. | =undefined. A quantity is defined mathematically to be "undefined" if such a quantity or any logical operation involved with such a quantity has no meaning (i.e., has no value attribute).
4. F(.) indicates that F is determined by variables not explicitly stated.

FIGS. 1-7

FIGS. 1 through 7 can be described by the Boolean equations shown hereinbelow.

Figure 1:
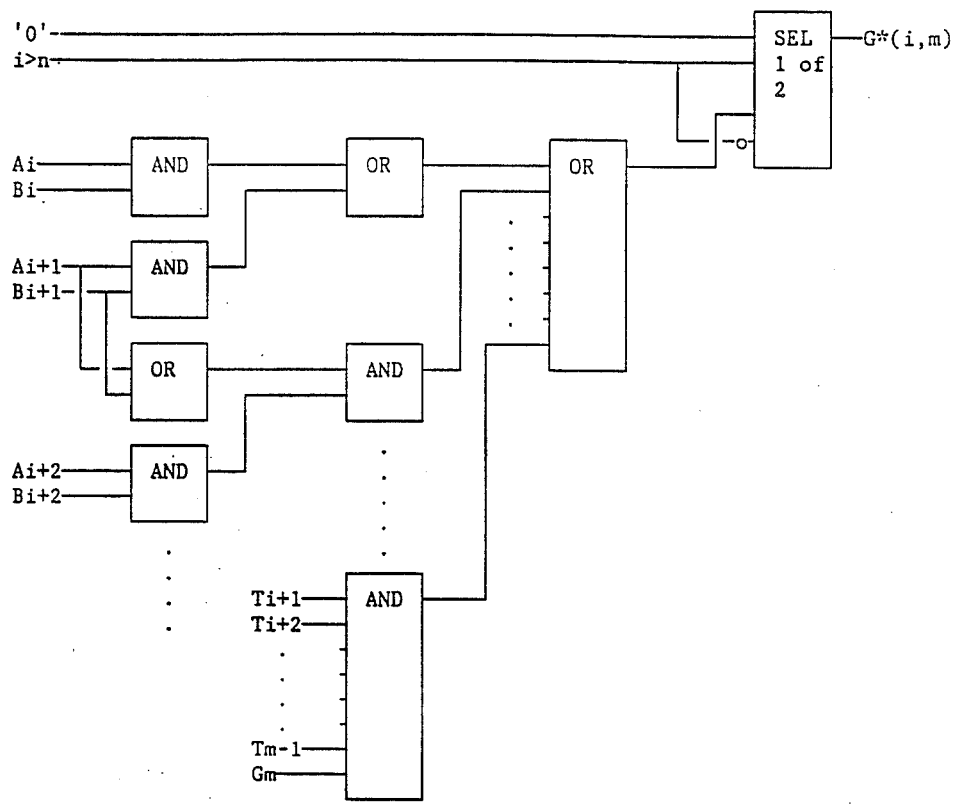
FIG. 1 is a schematic block diagram showing the circuitry necessary to produce a pseudo generate signal.
Figure 2:
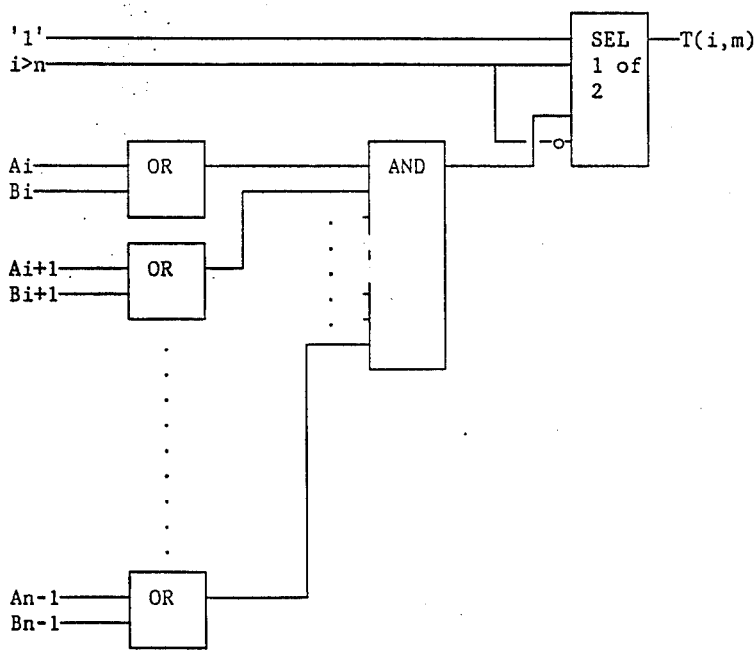
FIG. 2 is a schematic block diagram showing the circuitry necessary to produce a pseudo transmit signal.
Figure 3:
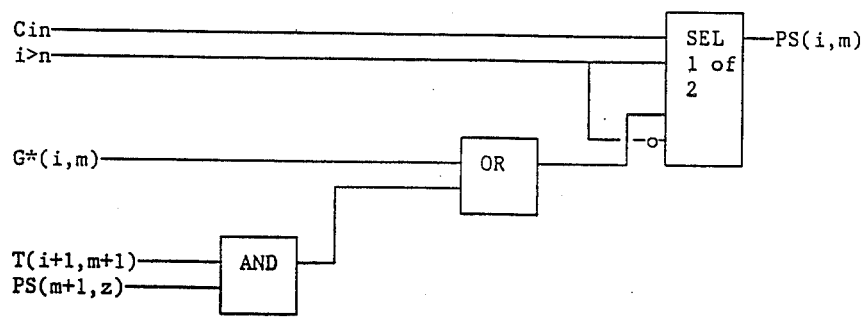
FIG. 3 is a schematic block diagram showing the circuitry necessary to produce a new-carry signal.

Referring now to FIG. 1, the pseudo generate signal is described from bit i to bit m, such that i≦m and:

$G^*_{(i,m)} = 0$ if $i > n$ $G^*_{(i,m)} = G_i + G_{i+1} + T_{i+1}G_{i+2} + T_{i+1}T_{i+2}\cdot G_{i+3} + \ldots + T_{i+1}T_{i+2}T_{i+3}\ldots T_{m-1}G_m$ if $i \leq n$ Referring now also to FIG. 2, the pseudo transmit signal is described from bit i to bit m, $T_{(i,m)}$, with $i \leq m$:

$T_{(i,m)} = 1$ if $i > n$ $T_{(i,m)} = T_i T_{i+1} T_{i+2} \ldots T_{m-1} T_m$ if $i \leq n$ Referring now also to FIG. 3, the new-carry is described from bit i to bit m, $PS_{(i,m)}$, such that $i \leq m$:

$PS_{(i,m)} = Cin$ if $i > n$ $PS_{(i,m)} = G^*_{(i,m)} + T_{(i+1,m+1)}PS_{(m+1,z)}$ if $i \leq n$ where z is a natural number such that $m < z$ and Cin is the carry into the adder.

Figure 4:
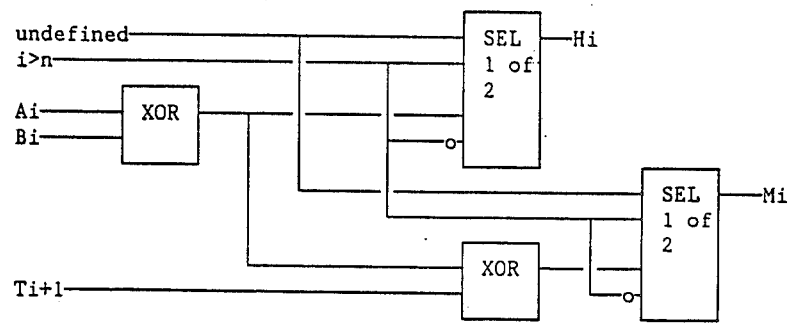
FIG. 4 is a schematic block diagram showing the circuitry necessary to produce pseudo half sum and pseudo transmit half sum signals.

Referring now also to FIG. 4, $H_i$, the pseudo half sum, is described for bit i.

$H_i = |$ if $i > n$ $H_i = A_i \veebar B_i$ if $i \leq n$ and FIG. 4 also describes $M_i$, the pseudo transmit half sum for bit i.

$M_i = |$ if $H_i = |$ $M_i = H_i \veebar T_{i+1}$ if $H_i \neq |$

Figure 5:
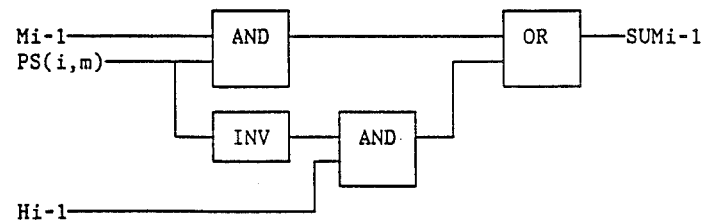
FIGS. 5-7 are schematic block diagrams that show the circuitry necessary to produce a SUM of a given bit of the addition.

Referring now also to FIG. 5, equations are described that will compute the SUM, provided that the proper quantities involved with the expressions are previously calculated.

$SUM_{i-1} = M_{i-1} PS_{(i,m)} + H_{i-1} PS_{(i,m)}'$

The equation described by FIG. 5 and the equation described by FIG. 3 are parametrical. The parameters involved are arbitrary (i.e., no law attributes a value to them). The only restriction imposed to the parameters by the definitions is that:

$i \leq m < z$

Using the above premises, by imposing different boundaries to the variables present into to the SUM formulas, and by appropriate substitutions, recursions in PS(.) are removed and some are corollaries.

Figure 6:
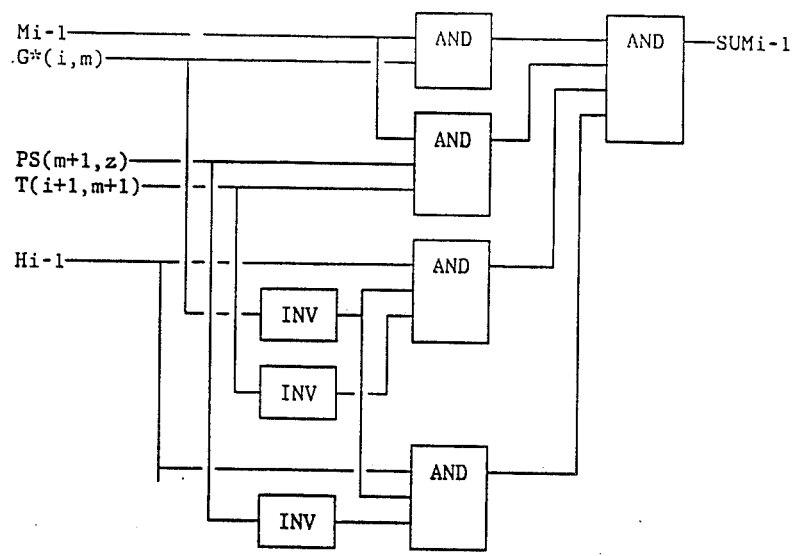
Figure 7:
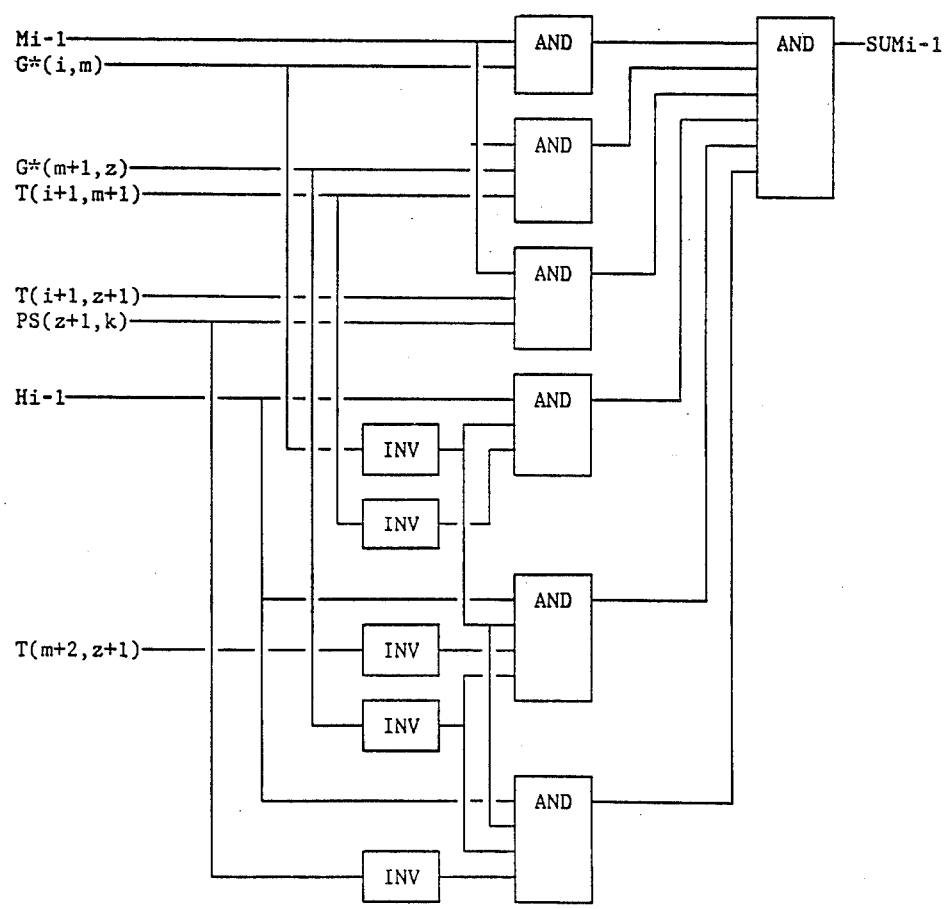

Referring now also to FIGS. 6 and 7, the circuitry needed to compute the SUM equations for two of the corollaries are described.

FIG. 6 describes the following Boolean equation:

$$SUM_{i-1} = M_{i-1}G^*_{(i,m)} + M_{i-1}T_{(i+1,m+1)}PS_{(m+1,z)} + H_{i-1}T_{(i+1,m+1)}'G^*_{(i,m)'} + H_{i-1}G^*_{(i,m)}'PS_{(m+1,z)'}$$

FIG. 7 describes the following equation:

$$SUM_{i-1} = M_{i-1}G^*_{(i,m)} + M_{i-1}T_{(i+1,m+1)}G^*_{(m+1,z)} + M_{i-1}T_{(i+1,z+1)}PS_{(z+1,k)} + H_{i-1}T_{(i+1,m+1)}'G^*_{(i,m)'} + H_{i-1}G^*_{(i,m)}'G^*_{(m+2,z+1)}'G^*_{(m+1,z)} + H_{i-1}G^*_{(i,m)}'G^*_{(m+1,z)}'PS_{(z+1,k)'}$$

New Recursive Formulas For The Sum

The following proves that the aforementioned definitions and SUM expressions will preserve the addition function.

LEMMA 1

$G_{(i,m)} = T_i G^*_{(i,m)}$ if $i,m \leq n$

Proof by definition $$\begin{aligned} G_{(i,m)} &= G_i + T_i G_{i+1} + T_i T_{i+1} G_{i+2} + \ldots + \\ &\quad T_i T_{i+1} T_{i+2} \ldots T_{m-1} G_m \\ &= G_i + T_i G_{i+1} + T_{(i,i+1)} G_{i+2} + \ldots + \\ &\quad T_{(i,m-1)} G_m \end{aligned}$$

but $T_i G_i = G_i$

Thus $G_{(i,m)} = T_i(G_i + G_{i+1} + T_{i+1}G_{i+2} + \ldots + T_{(i+1,m-1)}G_m)$
$= T_i G^*_{(i,m)}$

LEMMA 2

$G^*_{(i,z)} = G^*_{(i,m)} + T_{(i+1,m+1)}G^*_{(m+1,z)}$ such that $m < z$

Proof by definition $$\begin{aligned} G^*_{(i,z)} &= G_i + G_{i+1} + T_{i+1}G_{i+2} + \ldots + T_{i+1}\ldots T_{m-1}G_m + \\ &\quad T_{i+1}\ldots T_{m-1}T_m G_{m+1} + T_{i+1}T_{i+2}\ldots \\ &\quad T_m T_{m+1} G_{m+2} + \ldots + \\ &\quad T_{i+1}T_{i+2}\ldots T_{m-1}T_m T_{m+1}\ldots T_{z-1}G_z \\ &= G^*_{(i,m)} + T_{(i+1,m+1)}(G_{m+1} + G_{m+2} + \ldots + \\ &\quad T_{m+2}\ldots T_{z-1}G_z) \\ &= G^*_{(i,m)} + T_{(i+1,m+1)}G^*_{(m+1,z)} \end{aligned}$$

LEMMA 3

$PS_{(m,z)} = PS_{(m,n)} = G^*_{(m,n)} + T_{(m+1,n)}Cin$

Proof

Case 1: if $z \geq n$ by definition (FIG. 3)

$PS_{(m,z)} = G^*_{(m,z)} + T_{(m+1,z+1)}PS_{(z+1,x)}$ with x some N by definition (FIG. 1) and reduction $$G^*_{(m,z)} = G_m + G_{m+1} + T_{m+1}G_{m+2} + \ldots +$$
$$T_{m+1}T_{m+2}\ldots T_{n-1}G_n +$$
$$T_{m+1}T_{m+2}T_{m+3}\ldots T_nT_{n+1}(G_{n+1} + G_{n+2} + \ldots +$$
$$T_{n+2}\ldots T_{z-1}G_z)$$

but $G_{n+1} + G_{n+2} + \ldots + T_{n+2} \ldots T_{z-1}G_z = G^*_{(n+1,z)} = 0$ Thus $G^*_{(m,z)} = G^*_{(m,n)}$ by definition (FIG. 2)

$$T_{(m+1,z+1)} = T_{m+1}T_{m+2}\ldots T_nT_{n+1}\ldots T_{z+1}$$
$$= T_{(m+1,n)}T_{(n+1,z+1)}$$

but $T_{(n+1,z+1)} = 1$

Thus $T_{(m+1,z+1)} = T_{(m+1,n)}$ by definition (FIG. 3)

$PS_{(z+1,x)} = $ Cin because $z+1 > n$.

Thus it can be concluded that $PS_{(m,z)} = G^*_{(m,n)} + T_{(m+1,n)}$Cin if $z \geq n$ Case 2: $z < n$ (0.0) $PS_{(m,z)} = G^*_{(m,z)} + T_{(m+1,z+1)}PS_{(z+1,X)}$ such that:

(0.1) $z < X \leq n$ or (0.2) $X > n$ subcase 1

(0.1) implies that there exists some succession of natural numbers such that $z < X < X_0 < X_1 < X_2 < \ldots < X_j < X_i$ such that $X_i = n$.

By substitutions and by definition 2 (0.1), $$PS_{(m,z)} = G^*_{(m,z)} + T_{(m+1,z+1)}G^*_{(z+1,X)} +$$
$$T_{(m+1,X+1)}G^*_{(X+1,X_0)} + T_{(m+1,X_0+1)}G^*_{(X_0+1,X_1)} +$$
$$T_{(m+1,X_1+1)}G^*_{(X_1+1,X_2)} + \ldots +$$
$$T_{(m+1,X_j)}G^*_{(X_j,X_i)} + T_{(m+1,X_i+1)}PS_{(n+1,y)}$$

By applying lemma 2 as many times as needed:

$PS_{(m,z)} = PS_{(m,n)}$

Thus the lemma holds for subcase 1.

subcase 2

(0.2) implies that by substitution (0.0) can be written as:

$PS_{(m,z)} = G^*_{(m,z)} + T_{(m+1,z+1)}G^*_{(z+1,n)} + T_{(m+1,z+1)}T_{(z+2,n)}PS_{(n+1,X)}$

By lemma 2 and the definition of PS(.)

$PS_{(m,z)} = G^*_{(m,n)} + T_{(m+1,n)}$Cin

Thus lemma 3 holds true for subcase 2.

Theorem 1

The following set of equations is equivalent to the addition.

(2.1) $SUM_{i-1} = M_{i-1}PS_{(i,m)} + H_{i-1}PS_{(i,m)}'$ (2.2) $PS_{(i,m)} = G^*_{(i,m)} + T_{(i+1,m+1)}PS_{(m+1,z)}$

Proof (2.1) implies:

$$SUM_{i-1} = (H_{i-1}'T_i + H_{i-1}T_i')PS_{(i,m)} + H_{i-1}PS_{(i,m)}'$$
$$= H_{i-1}'T_iPS_{(i,m)} + H_{i-1}T_i'PS_{(i,m)} + H_{i-1}PS_{(i,m)}'$$
$$= H_{i-1}'T_iPS_{(i,m)} + H_{i-1}(T_i'PS_{(i,m)} + PS_{(i,m)}')$$
$$= H_{i-1}'T_iPS_{(i,m)} + H_{i-1}(T_i' + PS_{(i,m)}')$$
$$= H_{i-1}'T_iPS_{(i,m)} + H_{i-1}(T_iPS_{(i,m)})'$$
$$= H_{i-1} \; \forall \; T_iPS_{(i,m)}$$

Case 1: $i > n+1$
if $i > n+1$ by definition (FIG. 4)

$SUM_{i-1} = |$

Case 2: $i = n+1$
by definitions (FIGS. 2 and 3)

$T_i = 1$ and $PS_{(i,m)} = $ Cin

Thus $T_iPS_{(i,m)} = $ Cin and $SUM_n = H_n \; \forall \;$ Cin

Thus the set of equations 2.1 and 2.2 is equivalent to the addition for the least significant bits.

Case 3: $i < n+1$
It must be proved that the carry to the bit position $i-1$, $C_i$ is equal to $T_iPS_{(i,m)}$ with $PS_{(i,m)}$ defined by (2.2). This is because in this case $H_{i-1}$ is always defined to be equal to the half sum.

Given that $C_i = G_{(i,n)} + T_{(i,n)}$Cin, prove that:

(1) $G_{(i,n)} + T_{(i,n)}$Cin $= T_iPS_{(i,m)}$

By lemma 3 $PS_{(i,m)} = G^*_{(i,n)} + T_{(i+1,n)}$Cin

Thus $T_iPS_{(i,m)} = T_i(G^*_{(i,n)} + T_{(i+1,n)}Cin)$
$= T_iG^*_{(i,n)} + T_iT_{(i+1,n)}Cin$ but $T_iG^*_{(i,n)} = G_{(i,n)}$ (lemma 1)
and by definition $T_iT_{(i+1,n)} = T_{(i,n)}$ Thus $G_{(i,n)} + T_{(i,n)}$Cin $= T_iPS_{(i,m)}$ Equations 2.1 and 2.2 are parametrical. The parameters involved are arbitrary (i.e., no law attributes a value to them). The only restriction imposed on the parameters by the foregoing definitions is that:

$i \leq m \leq z$

Using the above premises, imposing different boundaries to the variables present into to the SUM formulas, and by appropriate substitutions, recursions in PS(.) can be removed and some are reported as the following corollaries:

Corollary 1 (removal of one recurrence)

The following set of equations is equivalent to the addition.

$$(2.3)\ SUM_{i-1} = M_{i-1}G^*_{(i,m)} + M_{i-1}T_{(i+1,m+1)}PS_{(m+1,z)} +$$
$$H_{i-1}T_{(i+1,m+1)}{'G^*_{(i,m)}}' +$$
$$H_{i-1}G^*_{(i,m)}{'PS_{(m+1,z)}}'$$

$$(2.4)\ PS_{(m+1,z)} = G^*_{(m+1,z)} + T_{(m+2,z+1)}PS_{(z+1,k)}$$

Proof

By direct substitution of (2.2) into (2.1) and imposing $i \leq m < z < k$.

Corollary 2 (removal of two recurrences)

The following set of equations is equivalent to the addition.

$$(2.5)\ SUM_{i-1} = M_{i-1}G^*_{(i,m)} + M_{i-1}T_{(i+1,m+1)}G^*_{(m+1,z)} +$$
$$M_{i-1}T_{(i+1,z+1)}PS_{(z+1,k)} +$$
$$H_{i-1}T_{(i+1,m+1)}{'G^*_{(i,m)}}' +$$
$$H_{i-1}G^*_{(i,m)}{'T_{(m+2,z+1)}}{'G^*_{(m+1,z)}}' +$$
$$H_{i-1}G^*_{(i,m)}{'G^*_{(m+1,z)}}{'PS_{(z+1,k)}}'$$

$$(2.6)\ PS_{(z+1,k)} = G^*_{(z+1,k)} + T_{(z+2,k+1)}PS_{(k+1,x)}$$

Proof

Same procedure as corollary 1 with the imposition $i \leq m < z < k < x$.

Corollary 3 (removal of three recurrences)

The following set of equations is equivalent to the addition.

$$(2.7)\ SUM_{i-1} = M_{i-1}G^*_{(i,m)} + M_{i-1}T_{(i+1,m+1)}G^*_{(m+1,z)}$$
$$M_{i-1}T_{(i+1,z+1)}G^*_{(z+1,k)} +$$
$$M_{i-1}T_{(i+1,k+1)}PS_{(k+1,x)} +$$
$$H_{i-1}T_{(i+1,m+1)}{'G^*_{(i,m)}}' +$$
$$H_{i-1}G^*_{(i,m)}{'T_{(m+2,z+1)}}{'G^*_{(m+1,z)}}' +$$
$$H_{i-1}G^*_{(i,m)}{'G^*_{(m+1,z)}}{'G^*_{(z+1,k)}}{'T_{(z+2,k+1)}}' +$$
$$H_{i-1}G^*_{(i,m)}{'G^*_{(m+1,z)}}{'G^*_{(z+1,k)}}{'PS_{(k+1,x)}}'$$

$$(2.8)\ PS_{(k+1,x)} = G^*_{(k+1,x)} + T_{(k+2,x+1)}PS_{(x+1,y)}$$

Proof

Same procedure as corollary 1 with the imposition $i \leq m < z < k < x < v$.

THEOREM 2

For every removal of recursion:
(1) the resulting expressions have two terms that are recursive, namely one that contains the new-carry and one that contains its complement;
(2) there are two OR terms added in respect to the previous removal;
(3) the terms that contain recursion are maximum width ANDs; and
(4) if an 'm'-way was the maximum-way AND in the previous removal then an 'm+1'-way AND is the maximum-way AND in the current removal.

Proof by Induction

Theorem 1 and corollary 1 imply that the base of the induction holds true (i.e., for $i=0$ and $i=1$).

Suppose that it is true for the removal i. In that case:
(1) if $F_i(.)$ is a Boolean expression not recursive and $R_i(.), Y_i(.), G_i^*(.)$ and $T_i(.)$ are not recursive terms, then for the ith removal:

$$(2.9)\ SUM_{(i-1)} = F_i(.) + R_i(.)PS_i(.) + Y_i(.)PS_i(.)'$$

$$(2.10)\ PS_i(.) = G_i^*(.) + T_i(.)PS_{i+1}(.)$$

(2) if there were n-2 terms in the previous removal then (2.9) contains n terms;
(3) the terms $R_i(.)PS_i(.)$ and $Y_i(.)PS_i(.)'$ are m-way ANDs such that m is maximum-way in (2.9); and
(4) the maximum-way AND in the previous removal was m-1.

It must be proven that the theorem holds for $i+1$. By substituting (2.10) into (2.9) implies:

$$SUM_i = F_i(.) + R_i(.)G_i^*(.) + R_i(.)T_i(.)PS_{i+1}(.) + Y_i(.)G_i^*(.)'T_i(.)' + Y_i(.)G_i^*(.)'PS_{i+1}(.)'$$

Thus by the $i+1$ removal:
(1) of all terms involved in SUM, two are recursive;
(2) the number of terms involved is $n+2$; and
(3) given the fact that $Y_i(.)PS_i(.)$ and $R_i(.)PS_i(.)$ were maximum-way ANDs and the fact that $F_i(.)$ remains unchanged, the maximum width ANDs are the terms $Y_i(.)G_i^*(.)'T_i(.)'$, $R_i(.)T_i(.)PS_{i+1}(.)$ and $Y_i(.)G_i^*(.)'PS_{i+1}(.)'$ which includes the two recursive terms. Because the width of the AND was m, all the above quantities are 'm+1'-way ANDs.

Therefore the theorem holds for every removal of a recursion.

Theorem 3

The equation that computes the SUM is $(i+2) \times 2(i+1)$ AND-OR function i being equal to the number of the removed recurrences.

Proof by Induction for $i=0$

The theorem holds because (2.1) is a $2 \times 2$ AND-OR.
Suppose it is true for i. Prove that, for $i+1$, the SUM is a $(i+3) \times 2(i+2)$ AND-OR.

Given that the theorem holds for i and because of theorem 2 the removal of the $i+1$ recursion implies that the maximum-way AND will be $i+2+1=i+3$ and the maximum-way OR $2(i+1)+2=2(i+2)$. Thus the SUM is a $(i+3) \times 2(i+2)$ AND-OR and the theorem holds true for all the removals of recursion.

General Comparison Between the Schemas

While it is true that given a technology any schema may be implemented with one or more algorithms, one fact remains unique: the expressions that describe a function from its positive and/or negative primary inputs will implicitly or explicitly determine the width of the gates and consequently the equivalent books needed for an optimal implementation of the function. Because actual technologies do not allow arbitrary width gates and/or books, it can be inferred that such expressions directly or indirectly will determine the corresponding logic levels in an optimal implementation of the given function with an appropriate algorithm for any chosen technology. Thus, since in each logic level there is associated a delay and a number of cells (two of the major concerns in logic design), the "primary" expressions determine performance and area.

The above premises imply that, if two formulations exist for a function (e.g., addition) then a comparison of their AND-OR equations formulated using only the "primary" terms can certainly be used as measure of performance and cost in terms of area.

One of the objects of this invention is to shorten the critical paths of the adder and therefore to prove the superiority of the present invention with respect to conventional processes. It is sufficient to prove that the expressions involved are inherently better to implement independent of the technology and algorithms. This can be achieved by proving that the width of the "primary" expressions involved in the critical paths are of a lesser magnitude than the ones involved in conventional methods of addition and that the area required to produce the critical expressions in the present method is smaller. That is because even if it may be the case that the final formulation of the SUM as described by this new schema may require more hardware, this hardware will be involved with the non-critical paths. Thus, if the width of the "primary" expressions and the area involved in the critical paths are less, then the critical paths have been improved.

For the addition function both schemas imply that the delay of the critical paths are the ones that contain recursion, namely $C_i$ as described by (1.b) and $PS_{(i,m)}$ as described by (2.2), while the other expressions that determine the SUM can be computed immediately.

Theorem 4

If # is the number of OR terms needed to produce $PS_{(i,m)}$ starting from the primary inputs, then $2\#-1$ terms are needed to produce $C_i$.

Proof

By lemma 3

$$PS_{(i,m)} = G^*_{(i,n)} + T_{(i+1,n)}Cin$$

Let g,t be the OR terms needed respectively for $G^*_{(i,n)}$ and $T_{(i+1,n)}Cin$ Then $\# = g + t$ Given that $C_i = G_{(i,n)} + T_{(i,n)}Cin$ and because of lemma 1:

$$G_{(i,n)} = T_i G^*_{(i,n)} = G_i + T_i G_{(i+1,n)}$$

but $G^*_{(i,n)} = G_i + G_{(i+1,n)}$

Thus $G_{(i+1,n)}$ has g-1 OR terms. Given that $T_i$ has two OR terms:

$G_{(i,n)}$ has $1 + 2(g-1) = 2g - 1$ terms.

Given that Cin will not produce an extra OR term and by definition $T_{(i,n)} = T_i T_{(i+1,n)}$ then: $T_{(i,n)}$ has $2t$ OR terms and $C_i$ has $2(g+t) - 1 = 2\# - 1$ OR terms.

Theorem 5

$PS_{(i,m)}$ contains exactly $2^{(n-i+1)}$ OR terms if fully expanded.

Proof $G^*_{(i,n)}$ contains:

$$1 + 1 + 2 + 2^2 + 2^3 + \ldots + 2^{(n-i-1)} = 1 + 2^{(n-i)} - 1 = 2^{(n-i)} \text{ OR terms.}$$

And $T_{(i+1,n)}$ contains: $2^{(n-i)}$ OR terms.
Given that Cin does not produce OR terms and by lemma 3 $PS_{(i,m)} = PS_{(i,n)} = G^*_{(i,n)} + T_{(i+1,n)}Cin$
Thus $PS_{(i,m)}$ contain $2^{(n-i)} + 2^{(n-i)} = 2^{(n-i+1)}$ OR terms.

Theorem 6

$PS_{(i,m)}$ contains: one two-way AND, $2^{(n-i)}(n-i+1)$-way ANDs and $2^{(r-2)}$ r-way ANDs with r getting all the values between and including 2 and $n-i+1$ if fully expanded.

Proof

The definition $G^*_{(i,m)}$ implies that there is at least one two-way AND in $PS_{(i,n)}$—the one due to the $G_i$ term.

The terms in $G^*_{(i,m)}$ are a geometrical series after $G_i$ and the definition of the T's dictates that the width due to the T terms be equal to the corresponding power of 2. Then if r-way corresponds to the jth power of 2 in the series the definition of G determines that $r = j + 2$. For each power there will be $2^{(r-2)}$ r-way ANDs in $PS_{(i,n)}$. Given that $0 \leq j \leq n-i-1$, then $2 \leq j + 2 \leq n-i-1+2$ and r belongs to N such that $2 \leq r \leq n-i+1$.

Finally, because of the definition of T's, there are $2^{(n-1)}$ OR terms in $T_{(i+1,n)}Cin$. Given that Cin will add an extra input to the ANDs, there exist $2^{(n-i)}(n-i+1)$-way ANDs in $PS_{(i,n)}$.

Theorem 7

There are $2^{(n-i+1)}(n-i+2)$-way ANDs and $2^{(r-2)}$ r-way ANDs with r getting all the values between and including 2 and $n-i+2$ in $C_i$.

Proof

By the same reasoning as in the previous theorem and realizing that the terms in $G_{(i,n)}$ are a geometrical series beginning from bit i and the fact that $C_i$ contains the term $T_{(i,n)}$ instead of $T_{(i+1,n)}$.

Theorem 8

There are exactly $2^{(n-i+2)} - 1$ OR terms in $C_i$.

Proof

Follows immediately from theorems 4 and 5.

Theorem 9

$C_i$ requires more area than $PS_{(i,m)}$.

Proof

Follows immediately from theorems 5, 6 and 8.

Theorem 10

The width of the gates involved to produce $C_i$ from its primary inputs is of a greater magnitude than the ones that produce PS(.)

Proof

Follows immediately from theorems 4, 5, 6, and 7.

Theorems 4 through 10 determine that the methodology proposed by this study will contain in its critical paths less hardware as well as less "primary" terms in its expressions than do the traditional formulation of the critical paths.

If a full carry-look-ahead is not permitted (which is the case in certain technologies) then the grouping in the factorization process will be bigger in PS(.) than in $C_i$. Therefore, PS(.) ripples less. Since rippling is directly translated to delay, the proposed schema results in implementations of faster adders than conventional adders.

One other advantage for the methodology herein described in that the corollaries explicitly state, depending on technology, that the last logic level can be used more efficiently. That is, the paths can be broken into more than one, thus removing the dependencies of PS(.) into the bit that the SUM is calculated. Nevertheless the Cin can be used on the first logic level to produce PS(.) for high order bits.

FIGS. 8–20

FIGS. 8–20 refer to equations discussed hereinbelow that describe the critical path of $SUM_0$, and by extension, every other path. This demonstrates the design of an adder of three logic stages with the use of a maximum $3 \times 8$ AND-OR book. The diagrams represent the design of the present invention with simple gates that can be transformed to appropriate more complex books by any person skilled in the art of computer system design.

Figure 8:
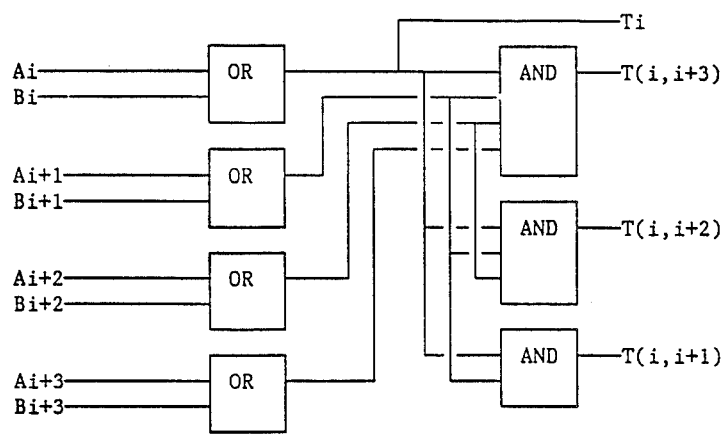
FIG. 8 is a schematic block diagram showing the circuitry necessary to produce pseudo quantities T for a group of bit-length 1, 2, 3, 4.

Referring now also to FIG. 8, circuits are described that are necessary to compute the following Boolean described equations:

$$T_{(i,i+3)} = (A_{(i)} + B_{(i)})(A_{(i+1)} + B_{(i+1)})(A_{(i+2)} + B_{(i+2)}) +$$

$$(A_{(i+3)} + B_{(i+3)})$$

$$T_{(i)} = A_{(i)} + B_{(i)}$$

$$T_{(i,i+1)} = (A_{(i)} + B_{(i)})(A_{(i+1)} + B_{(i+1)})$$

$$T_{(i,i+2)} = (A_{(i)} + B_{(i)})(A_{(i+1)} + B_{(i+1)})(A_{(i+2)} + B_{(i+2)})$$

Figure 9:
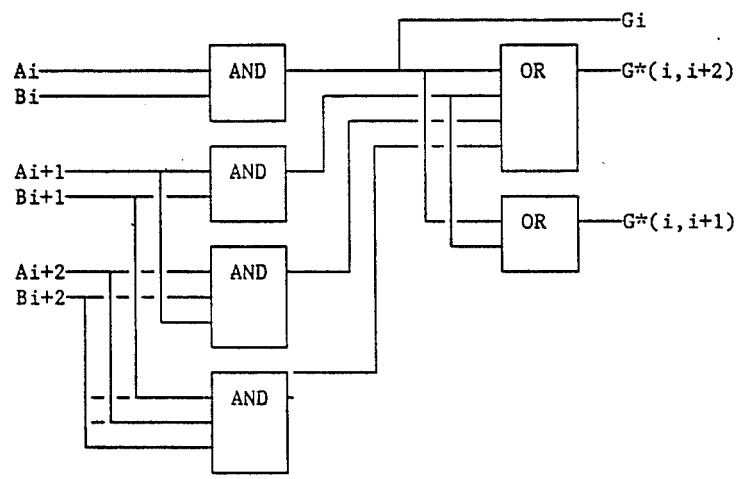
FIG. 9 is a schematic block diagram showing the circuitry necessary to produce pseudo quantities G* for a group of bit length 1, 2, 3.

Referring now also to FIG. 9, the following Boolean expressions are described:

$$G^*_{(i)} = A_{(i)}B_{(i)}$$

$$G^*_{(i,i+1)} = A_{(i)}B_{(i)} + A_{(i+1)}B_{(i+1)}$$

$$G^*_{(i,i+2)} = A_{(i)}B_{(i)} + A_{(i+1)}B_{(i+1)} + A_{(i+1)}A_{(i+2)}B_{(i+2)} +$$

$$B_{(i+1)}A_{(i+2)}B_{(i+2)}$$

Figure 10:
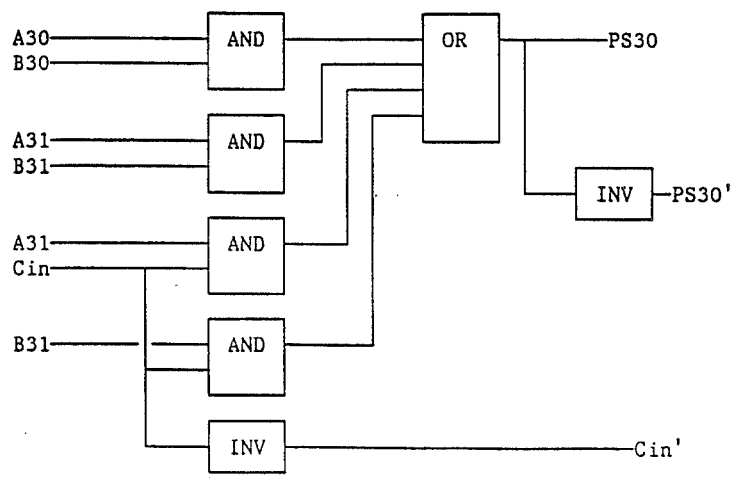
FIG. 10 is a schematic block diagram showing the circuitry necessary to produce $PS_{30}$, its negation, and the negation of the carry into the adder.

Referring now also to FIG. 10, the Boolean expression for the production of $PS_{30}$ and its complement is described. The complement has been produced by the negation of the $PS_{30}$ and if implemented that way the logic stages will be increased. Also, similar freedoms have been allowed in other places including the two previous FIGURES. This facilitates comprehension and diminishes the complexity of the FIGURES.

The Boolean expression for $PS_{30}$ is:

$$PS_{(30)} = A_{(30)}B_{(30)} + A_{(31)}B_{(31)} + A_{(31)}Cin + B_{(31)} \cdot Cin$$

Figure 11:
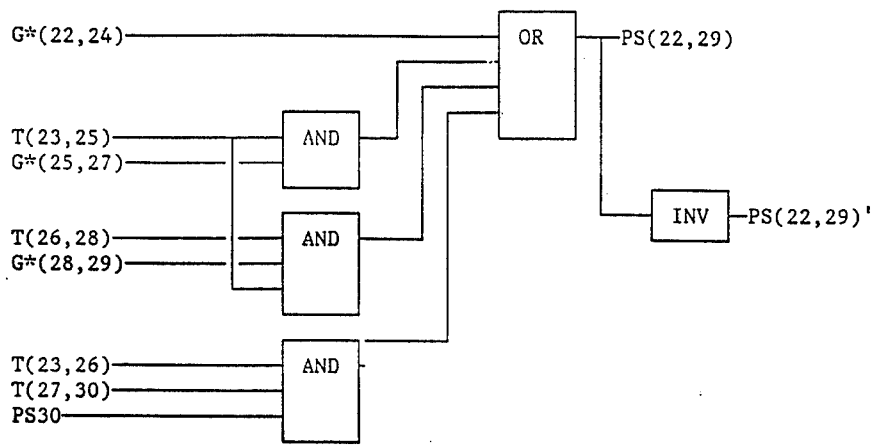
FIG. 11 is a schematic block diagram showing the circuitry necessary to produce $PS_{(22,29)}$ and the negation of the carry into the adder.
Figure 12:
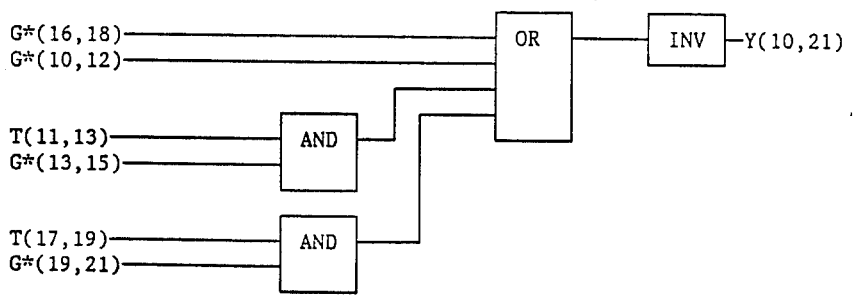
FIGS. 12-18 are schematic block diagrams that show the circuitry necessary to produce auxiliary functions $Y_{(10,21)}$, $L_{(16,22)}$, $Z_{(11,15)}$, $X_{(i,9)}$, $W_{(13,21)}$, $R_{(6,15)}$, and $Q_{(i,5)}$, respectively.
Figure 13:
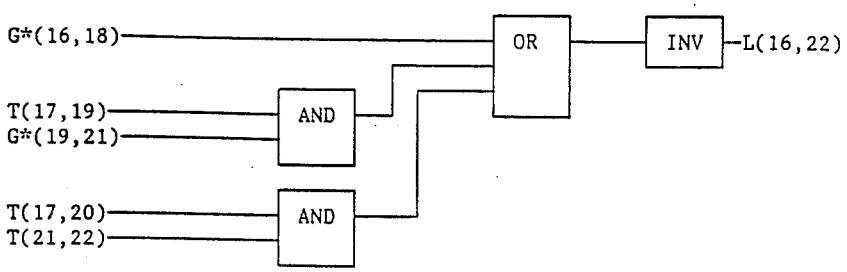
Figure 14:
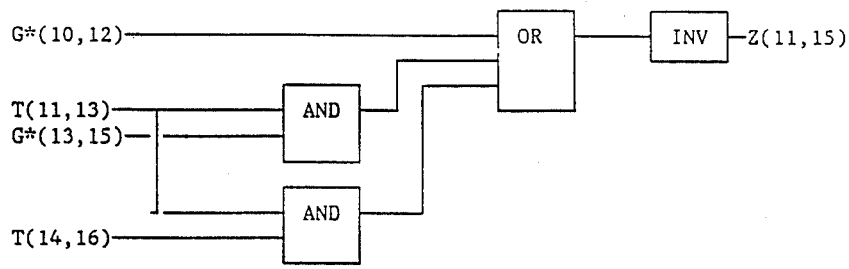
Figure 15:
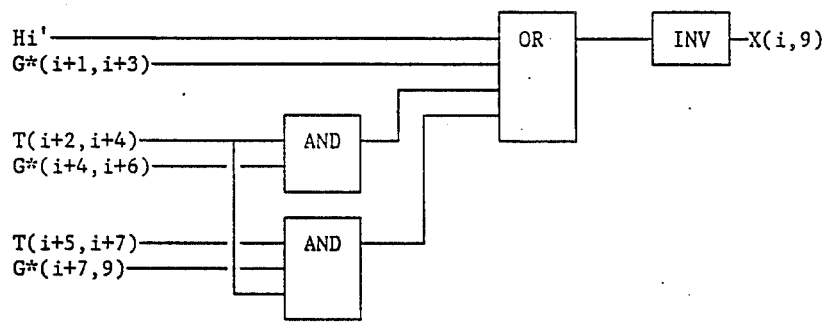
Figure 16:
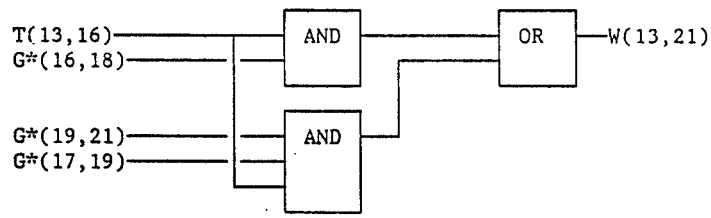
Figure 17:
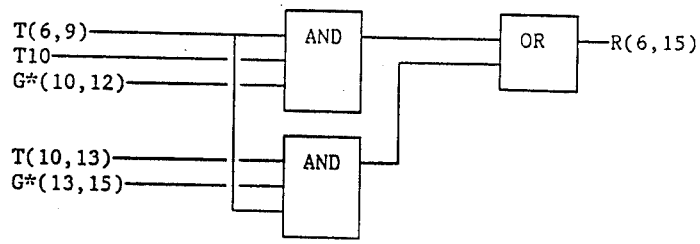
Figure 18:
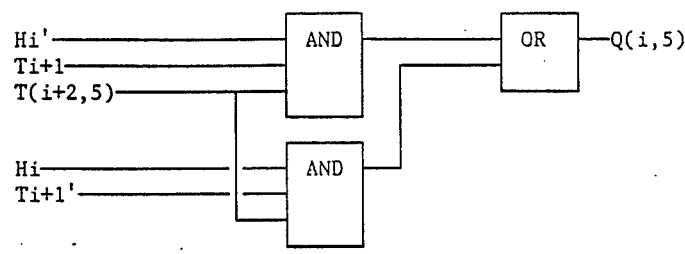

Referring now also to FIG. 11, circuitry for $PS_{(22,29)}$ and its complement is computed as follows:

$$PS_{(22,29)} = G^*_{(22,24)} + T_{(23,25)}G^*_{(25,27)} + T_{(23,25)}T_{(26,28)}G^*_{(28,29)} + T_{(23,26)}T_{(27,30)}PS_{(30)}$$

FIGS. 12–18 compute the Boolean expressions that calculate the auxiliary function, and described as shown hereinbelow.

$$Q_{(i,5)} = H_{(i)}'T_{(i+1)}T_{(i+2,5)} + H_{(i)}T_{(i+1)}'T_{(i+2,5)}R_{(6,15)}$$
$$= T_{(6,10)}G^*_{(10,15)}$$
$$= T_{(6,9)}T_{(10)}G^*_{(10,12)} + T_{(6,9)}T_{(10,13)}G^*_{(13,15)}$$

$$W_{(13,21)} = T_{(13,16)}G^*_{(16,21)}$$
$$= T_{(13,16)}G^*_{(16,18)} + T_{(13,16)}G^*_{(17,19)}G^*_{(19,21)}$$

$$X_{(i,9)} = (H_{(i)}' + G^*_{(i+1,i+3)} + T_{(i+2,i+4)}G^*_{(i+4,i+6)} + T_{(i+2,i+4)}T_{(i+5,i+7)}G^*_{(i+7,9)})'$$

$$Z_{(11,15)} = (T_{(11,13)}T_{(14,16)} + G^*_{(10,12)} + T_{(11,13)}G^*_{(13,15)})'$$

$$L_{(16,22)} = (G^*_{(16,18)} + T_{(17,19)}G^*_{(19,21)} + T_{(17,20)}T_{(21,22)})'$$

$$Y_{(10,21)} = (G^*_{(10,12)} + T_{(11,13)}G^*_{(13,15)} + G^*_{(16,18)} + T_{(17,19)}G^*_{(19,21)})'$$

Figure 19:
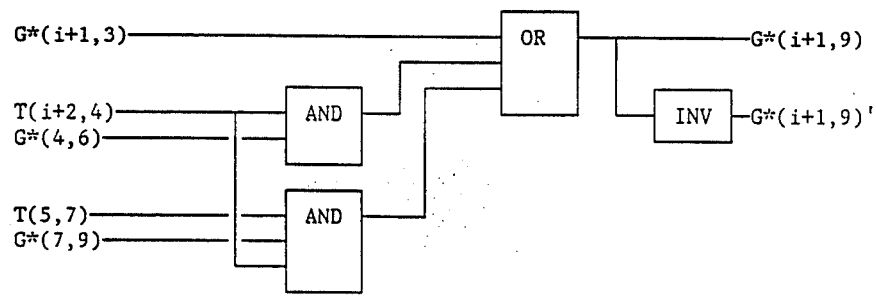
FIG. 19 produces the pseudo generate quantities $G^*_{(i+1,9)}$ and its complement for $i=0$.

Referring now also to FIG. 19, the Boolean expression is described that computes the pseudo generate signal for $i = 0$:

$$G^*_{(i+1,9)} = G^*_{(i+1,3)} + T_{(i+2,4)}G^*_{(4,6)} + T_{(i+2,4)}T_{(5,7)}G^*_{(7,9)}$$

Figure 20:
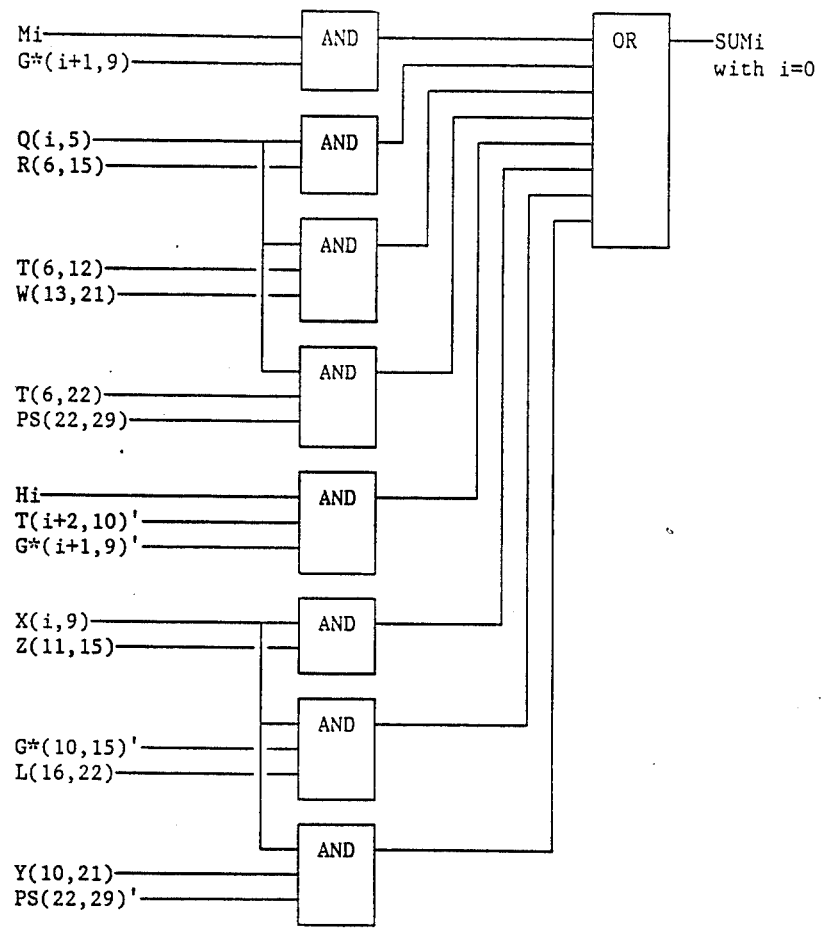
FIG. 20 produces the SUM for the critical path delay for $i=0$.

Referring now also to FIG. 20, the computation of $SUM_i$, with i belonging to the critical sum is described. For $i = 0$ then:

$$SUM_{(i)} = M_{(i)}G^*_{(i+1,9)} + Q_{(i,5)}R^{(6,15)} +$$

$$Q_{(i,5)}T_{(6,12)}W_{(13,21)} +$$

$$Q_{(i,5)}T_{(6,22)}PS_{(22,29)} +$$

$$H_{(i)}T_{(i+2,10)}'G^*_{(i+1,9)}' +$$

$$X_{(i,9)}Z_{(11,15)} +$$

$$X_{(i,9)}G^*_{(10,15)}'L_{(16,22)} +$$

$$X_{(i,9)}Y_{(10,21)}PS_{(22,29)}'$$

The Implementation

For the following section, notational conventions are as follows:
(1) ' is the inverse or NOT of the expression
(2) (a+b) is "a" logical OR "b"
(3) (ab) is "a" logical AND "b"

The critical path of the three stage adder is described as follows. The SUM of bit 0 requires maximum add time. That is, it lies on the critical path. Therefore, the design of $SUM_0$ dictates the maximum delay of the adder implementation. By applying corollary 3, $SUM_0$ can be expressed as follows:
For $i = 0$, $$SUM_i = M_{(i)}G^*_{(i+1,9)} + M_{(i)}T_{(i+2,10)}G^*_{(10,15)} +$$

$$M_{(i)}T_{(i+2,16)}G^*_{(16,21)} + M_{(i)}T_{(i+2,22)}PS_{(22,29)} +$$

$$H_{(i)}T_{(i+2,10)}'G^*_{(i+1,9)}' +$$

$H_{(i)}G^*_{(i+1,9)}'T_{(11,16)}'G^*_{(10,15)}' +$ $H_{(i)}G^*_{(i+1,9)}'G^*_{(10,15)}'G^*_{(16,21)}'T_{(17,22)}' +$ $H_{(i)}G^*_{(i+1,9)}'G^*_{(10,15)}'G^*_{(16,21)}'PS_{(22,29)}'$

It is obvious that the $SUM_0$ as described previously cannot be implemented in one stage by using a $3 \times 8$ AND-OR book. However it can be rewritten as follow for $i=0$:

$SUM_i = M_{(i)}G^*_{(i+1,9)} + Q_{(i,5)}R_{(6,15)} +$ $Q_{(i,5)}T_{(6,12)}W_{(13,21)} + Q_{(i,5)}T_{(6,22)}PS_{(22,29)} +$ $H_{(i)}T_{(i+2,10)}'G^*_{(i+1,9)}' + X_{(i,9)}Z_{(11,15)} +$ $X_{(i,9)}G^*_{(10,15)}'L_{16,22)} +$ $X_{(i,9)}Y_{(10,21)}PS_{(22,29)}'$ with:
$Q_{(i,5)} = M_{(i)}T_{(i+2,5)}$ $R_{(6,15)} = T_{(6,10)}G^*_{(10,15)}$ $W_{(13,21)} = T_{(13,16)}G^*_{(16,21)}$ $X_{(i,9)} = H_{(i)}G^*_{(i+1,9)}'$ $Z_{(11,15)} = T_{(11,16)}'G^*_{(10,15)}'$ $L_{(16,22)} = G^*_{(16,21)}'T_{(17,22)}'$ $Y_{(10,21)} = G^*_{(10,15)}'G^*_{(16,21)}'$ The transformed $SUM_0$ can be implemented in one stage in a $3 \times 8$ AND-OR book, assuming that all quantities included in the equations have been implemented previously.

Such quantities can be re-written as follows for $i=0$:

$G^*_{(i+1,9)} = G^*_{(i+1,3)} + T_{(i+2,4)}G^*_{(4,6)} + T_{(i+2,4)}T_{(5,7)}G^*_{(7,9)}$ $G^*_{(i+1,9)}' = (G^*_{(i+1,3)} + T_{(i+2,4)}G^*_{(4,6)} + T_{(i+2,4)}T_{(5,7)}G^*_{(7,9)})'$ $M_{(i)} = H_{(i)}'T_{(i+1)} + H_{(i)}T_{(i+1)}'$ $Q_{(i,5)} = H_{(i)}'T_{(i+1)}T_{(i+2,5)} + H_{(i)}T_{(i+1)}'T_{(i+2,5)}$ $R_{(6,15)} = T_{(6,10)}G^*_{(10,15)}$
$\quad\quad = T_{(6,9)}T_{(10)}G^*_{(10,12)} + T_{(6,9)}T_{(10,13)}G^*_{(13,15)}$ $W_{(13,21)} = T_{(13,16)}G^*_{(16,21)}$
$\quad\quad = T_{(13,16)}G^*_{(16,18)} + T_{(13,16)}G^*_{(17,19)}G^*_{(19,21)}$ $X_{(i,9)} = (H_{(i)}' + G^*_{(i+1,i+3)} + T_{(i+2,i+4)}G^*_{(i+4,i+6)} + T_{(i+2,i+4)}T_{(i+5,i+7)}G^*_{(i+7,9)})'$ $Z_{(11,15)} = (T_{(11,13)}T_{(14,16)} + G^*_{(10,12)} + T_{(11,13)}G^*_{(13,15)})'$ $L_{(16,22)} = (G^*_{(16,18)} + T_{(17,19)}G^*_{(19,21)} + T_{(17,20)}T_{(21,22)})'$ $Y_{(10,21)} = (G^*_{(10,12)} + T_{(11,13)}G^*_{(13,15)} + G^*_{(16,18)} + T_{(17,19)}G^*_{(19,21)})'$ -continued $PS_{(22,29)} = G^*_{(22,24)} + T_{(23,25)}G^*_{(25,27)} + T_{(23,25)}T_{(26,28)}G^*_{(28,29)} + T_{(23,26)}T_{(27,30)}PS_{(30)}$ $PS_{(22,29)}' = (G^*_{(22,24)} + T_{(23,25)}G^*_{(25,27)} + T_{(23,25)}T_{(26,28)}G^*_{(28,29)} + T_{(23,26)}T_{(27,30)}PS_{(30)})'$ In addition to those quantities, group transmit signals and their complements must be implemented. However, such implementation is not critical since they can be computed by AND and NAND logic. Also, the group pseudo generates ($G^*$) must be implemented. However, the groups involved are smaller than $G^*_{(i+1,9)}$. Therefore, smaller books, or books the same size as those used for $G^*_{(i+1,9)}$ are required for implementation.

The previous equations can be computed in one stage in a $3 \times 8$ AND-OR book, assuming that all quantities included in the equations have been implemented previously.

Such quantities can be expressed as follows:

$T_{(i,i+3)} = (A_{(i)}+B_{(i)})(A_{(i+1)}+B_{(i+1)})(A_{(i+2)}+B_{(i+2)})(A_{(i+3)}+B_{(i+3)})$ $T_{(i)} = A_{(i)} + B_{(i)}$ $T_{(i,i+1)} = (A_{(i)}+B_{(i)})(A_{(i+1)}+B_{(i+1)})$ $T_{(i,i+2)} = (A_{(i)}+B_{(i)})(A_{(i+1)}+B_{(i+1)})(A_{(i+2)}+B_{(i+2)})$ $G^*_{(i)} = A_{(i)}B_{(i)}$ $G^*_{(i,i+1)} = A_{(i)}B_{(i)} + A_{(i+1)}B_{(i+1)}$ $G^*_{(i,i+2)} = A_{(i)}B_{(i)} + A_{(i+1)}B_{(i+1)} + A_{(i+1)}A_{(i+2)}B_{(i+2)} + B_{(i+1)}A_{(i+2)}B_{(i+2)}$ $PS_{(30)} = A_{(30)}B_{(30)} + A_{(31)}B_{(31)} + A_{(31)}Cin + B_{(31)}Cin$ $PS_{(+)}' = (A_{(30)}B_{(30)} + A_{(31)}B_{(31)} + A_{(31)}Cin + B_{(34)}Cin)'$ $H_{(i)} = A_{(i)}'B_{(i)} + A_{(i)}B_{(i)}'$ for all i $H_{(i)}' = (A_{(i)}'B_{(i)} + A_{(i)}B_{(i)}')'$ for all i $Cin' = (Cin)'$ all of the previous quantities can be implemented, as needed, from the primary inputs to the adder. Therefore, three stages are needed to produce $SUM_0$ and, consequently, all other sums of the 32-bit adder.

Since other modifications and changes varied to fit particular operating requirements and environments will be apparent to those skilled in the art, the invention is not considered limited to the 32-bit adder example chosen for purposes of disclosure, and covers all changes and modifications which do not constitute departures from the true spirit and scope of this invention.

what is claimed is:

1. A method of high speed data processing through first stage, second stage and third stage logic circuits in a digital computer for adding two operands each having a predetermined length and obtaining a multibit result, the steps comprising:

generating with the first stage of logic circuits based on inputs of selected portions of the two operands a plurality of pseudo signals including pseudo generate, pseudo transmit, pseudo transmit half sum, and pseudo half sum signals;

generating with the second stage of logic circuits a plurality of different auxiliary signals produced from said pseudo generate, pseudo transmit, and pseudo half sum signals;

generating with the second stage of logic circuits a new-carry signal described by a recursive new-carry equation based on said pseudo generate and pseudo transmit signals; and generating with the third stage of logic circuits a recursive SUM equation as a function of said pseudo signals and said auxiliary signals and said new-carry signal to produce the multibit result for further processing in the computer.

2. The data processing method of adding in accordance with claim 1 wherein one of said psuedo signals comprises a psuedo generate signal from bit i to bit m, to be further delineated under the following definitions, $$G_i = A_i B_i$$

$$T_i = A_i + B_i$$

$A_i$ is the ith bith of the first of said operands and $B_i$ is the ith bit of the second of said operands, i is an integer, 0 is the most significant bit position and n is the least significant bit position of the result and bit position i of the result is less significant than bit position $i-1$ and more significant than bit position $i+1$, and such that $i \leq m$, $G^*_{(i,m)}$, described by the following Boolean expression:

$$G^*_{(i,m)} = 0 \text{ if } i > n; \text{ and}$$

$$G^*_{(i,m)} = G_i + G_{i+1} + T_{i+1}G_{i+2} + T_{i+1}T_{i+2}G_{i+3} + \ldots + T_{i+1}T_{i+2}T_{i+3} \ldots T_{m-1}G_m$$

if $i \leq n$.

3. The data processing method of adding in accordance with claim 2 wherein one of said pseudo signals comprises a pseudo transmit signal from bit i to bit m, $T_{(i,m)}$, with $i \leq m$, described by the following Boolean expression:

$$T_{(i,m)} = 1 \text{ if } i > n; \text{ and}$$

$$T_{(i,m)} = T_i T_{i+1} T_{i+2} \ldots T_{m-1} T_m$$

if $i \leq n$.

4. The method of adding in accordance with claim 3 wherein one of said pseudo signals comprises a pseudo half sum for bit i, $H_i$, described by the following Boolean expression:

$$H_i = |$$

if $i > n$ $$H_i = A_i \not\!\!{+} B_i$$

if $i \leq n$

| indicates no assigned value

5. The data processing method of claim 1 for use in a ripple carry implemented adder wherein said generating steps include generating said pseudo signals and said new-carry signal for every bit position in the operands.

6. The data processing method of claim 1 for use in a parallel adder wherein said generating steps include generating said pseudo half sum and said pseudo transmit half sum signals for each bit position as well as generating said pseudo generate and said pseudo transmit and said new-carry signals for a chosen grouping of bits in the operands.

7. The data processing method of claim 1 for use in a 32 bit adder wherein said generating steps are accomplished by logic circuits formed by AND gates having no more than 3 inputs and OR gates having no more than 8 inputs.

8. In a computer, an improved high speed adder with multiple logic stages for adding two operands each having a predetermined length of 32 bits, including:

first stage logic circuits;

intermediate stage logic circuits receiving certain inputs generated from said first stage logic circuits in order to produce a pseudo new-carry signal and multiple auxiliary signals;

final stage logic circuits receiving certain inputs generated from said first stage and said intermediate stage logic circuits including the pseudo new-carry signal and the multiple auxiliary signals; and wherein said first stage logic circuits produce a pseudo generate signal G* from bit i to bit m which constitutes at least one of the aforesaid certain inputs to said intermediate stage logic circuits to produce the pseudo new-carry signal and at least some of the multiple auxiliary signals, to be further delineated under the following definitions, $$G_i = A_i B_i$$

$$T_i = A_i + B_i$$

$A_i$ is the ith bit of the first of said operands and $B_i$ is the ith bit of the second of said operands, i is an integer, 0 is the most significant bit position and n is the least significant bit position of the result and bit position i of the result is less significant than bit position $i-1$ and more significant than bit position $i+1$, and such that $i \leq m$, $G^*_{(i,m)}$, described by the following Boolean expression:

$$G^*_{(i,m)} = 0$$

if $i > n$; and $$G^*_{(i,m)} = G_i + G_{i+1} + T_{i+1}G_{i+2} + T_{i+1}T_{i+2}G_{i+3} + \ldots + T_{i+1}T_{i+2}T_{i+3} \ldots T_{m-1}G_m$$

if $i \leq n$.

9. The adder in accordance with claim 8 further comprising a pseudo transmit signal from first stage logic circuits from bit i to bit m, $T_{(i,m)}$, with $i \leq m$, described by the following Boolean expression:

$$T_{(i,m)} = 1$$

if $i > n$; and $T_{(i,m)} = T_i T_{i+1} T_{i+2} \ldots T_{m-1} T_m$ if $i \leq n$.

10. The adder in accordance with claim 9 further comprising a pseudo half sum from first stage logic circuits for bit i, $H_i$, described by the following Boolean expression:

$H_i = |$ if $i > n$ $H_i = A_i \veebar B_i$ if $i \leq n$

| indicates no assigned value.

11. The adder in accordance with claim 8 wherein said first, second and third stage logic circuits include AND/OR books each formed by a combination of AND gates each having no more than three inputs and OR gates each having no more than eight inputs.

12. A method of high speed data processing using various logic circuits in a computer for adding two multibit binary data operands A and B which constitute digital signals in a computer in order to produce a multibit result, each operand having a predetermined length, comprising the steps of:

generating with certain logic circuits in the computer a plurality of pseudo signals including a pseudo generate signal, G, from bit i to bit m, such that $i \leq m$, $G^*_{(i,m)}$, described by the following Boolean expression:
$G^*_{(i,m)} = 0$ if $i > n$; and $G^*_{(i,m)} = G_i + G_{i+1} + T_{i+1}G_{i+2} + T_{i+1}T_{i+2}G_{i+3} + \ldots + T_{i+1}T_{i+2}T_{i+3} \ldots T_{m-1}G_m$ if $i \leq n$ and also a psuedo transmit signal from bit i to bit m, $T_{(i,m)}$, with $i \leq m$, described by the following Boolean expression:

$T_{(i,m)} = 1$ if $i > n$; and $T_{(i,m)} = T_i T_{i+1} T_{i+2} \ldots T_{m-1} T_m$ if $i \leq n$ and also a psuedo half sum for bit i, $H_i$, described by the following Boolean expression:

$H_i = |$ if $i > n$ $H_i = H_i \veebar B_i$ if $i \leq n$ and also a pseudo transmit half sum for bit, $M_i$, described by the following Boolean expression:

$M_i = |$ if $H_i = |$ $M_i = H_i \veebar T_{i+1}$ if $H_i \neq |$ generating a new-carry signal with additional logic circuits in the computer described by a recursive new-carry equation, with said additional logic circuits receiving inputs from the aforesaid certain logic circuits; and generating the aforesaid multibit result with further logic circuits in the computer receiving inputs from the aforesaid additional logic circuits including the new-carry signal, with said further logic circuits described by a recursive SUM equation as a function of said pseudo signals and said new-carry signal wherein $G_i = A_i B_i$ $T_i = A_i + B_i$ $A_i$ is the ith bit of the first of said operands and $B_i$ is the ith bit of the second of said operands, i is an integer, 0 is the most significant bit position and n is the least significant bit position of the result and bit position i of the result is less significant than bit position $i-1$ and more significant than bit position $i+1$, and

| indicates no assigned value.

13. The method of adding in accordance with claim 12 wherein said new-carry equation from bit i to bit m, $PS_{(i,m)}$, such that $i \leq m$, is described by the following Boolean expression:

$PS_{(i,m)} = Cin$      if $i > n$ $PS_{(i,m)} = G^*_{(i,m)} + T_{(i+1,m+1)} PS_{(m+1,z)}$ if $i \leq n$ z being some natural number such that $m < z$.

14. The method of adding in accordance with claim 13 wherein said recursive SUM equation, $SUM_{i-1}$, obeys the following Boolean expression:

$SUM_{i-1} = M_{i-1} PS_{(i,m)} + H_{i-1} PS_{(i,m)}'$.

15. The method of adding in accordance with claim 13 wherein said recursive SUM equation, $SUM_{i-1}$, obeys the following Boolean expression:

$SUM_{i-1} = M_{i-1} G^*_{(i,m)} + M_{i-1} T_{(i+1,m+1)} PS_{(m+1,z)} +$ $H_{i-1} T_{(i+1,m+1)}' G^*_{(i,m)}' +$ $H_{i-1} G^*_{(i,m)}' PS_{(m+1,z)}'$.

16. The method of adding in accordance with claim 13 wherein said recursive SUM equation, $SUM_{i-1}$, obeys the following Boolean expression:

$SUM_{i-1} = M_{i-1} G^*_{(i,m)} + M_{i-1} T_{(i+1,m+1)} G^*_{(m+1,z)} +$ $M_{i-1} T_{(i+1,z+1)} PS_{(z+1,k)} +$ $H_{i-1}T_{(i+1, m+1)}'G^*_{(i,m)}' +$ $H_{i-1}G^*_{(i,m)}'T_{(m+2,z+1)}+'G^*_{(m+1,z)}' +$ $H_{i-1}G^*_{(i,m)}'G^*_{(m+1,z)}'PS_{(z+1,k)}'.$

17. The method of adding in accordance with claim 13 wherein recurrences of new-carry equations are removed until said new-carry equations equal the carry into said addition, resulting in a plurality of SUM expressions.

18. A high speed data processing system in a computer having a three stage logic adder with various logic circuits for adding two operands each having a predetermined length of 32 bits including first circuit means in the adder for creating a psuedo generate signal, G', from bit i to bit m, such that $i \leq m$, $G^*_{(i,m)}$, described by the following Boolean expression:

$G^*_{(i,m)} = 0$ if $i > n$; and $G^*_{(i,m)} = G_i + G_{i+1} + T_{i+1}G_{i+2} + T_{i+1}T_{i+2}G_{i+3} + \ldots + T_{i+1}T_{i+2}T_{i+3} \ldots T_{m-1}G_m$ if $i \leq n$ second circuit means in the adder for creating a psuedo transmit signal from bit i to bit m, $T_{(i,m)}$, with $i \leq m$, described by the following Boolean expression:

$T_{(i,m)} = 1$ if $i > n$; and $T_{(i,m)} = T_iT_{i+1}T_{i+2} \ldots T_{m-1}T_m$ if $i \leq n$ third circuit means in the adder for creating a psuedo half sum for bit i, $H_i$, described by the following Boolean expression:

$H_i = |$                if $i > n$ $H_i = A_iB_i$       if $i \leq n$ fourth circuit means in the adder for creating a psuedo transmit half sum for bit i, $M_i$, described by the following Boolean expression:

$M_i = |$             if $H_i = |$ $M_i = H_iT_{i+1}$     if $H_i \neq |$ wherein $G_i = A_iB_i$ $T_i = A_i + B_i$ $A_i$ is the ith bit of the first of the operands and $B_i$ is the ith bit of the second of the operands, i is an integer, 0 is the most significant bit position and n is the least significant bit position of the result and bit position i of the result is less significant than bit position $i-1$ and more significant than bit position $i+1$, and $|$ indicates no assigned value.

19. The adder in accordance with claim 18 comprising AND-OR books not greater than a size of three-way AND gate and eight-way OR gate configurations.

20. The adder in accordance with claim 18 further comprising fifth circuit means creating a new-carry from bit i to bit m, $PS_{(i,m)}$, such that $i \leq m$, is described by the following Boolean expression:

$PS_{(i,m)} = Cin$                       if $i > n$ $PS_{(i,m)} = G^*_{(i,m)} + T_{(i+1,m+1)}PS_{(m+1,z)}$ if $i \leq n$ z being some natural number such that $m < z$.

21. The adder in accordance with claim 20 wherein a recursive SUM equation, $SUM_{i-1}$, obeys the following Boolean expression:

$SUM_{i-1} = M_{i-1}PS_{(i,m)} + H_{i-1}PS_{(i,m)}'.$

22. The adder in accordance with claim 20 wherein a recursive SUM equation, $SUM_{i-1}$, obeys the following Boolean expression:

$SUM_{i-1} = M_{i-1}G^*_{(i,m)} + M_{i-1}T_{(i+1,m+1)}PS_{(m+1,z)} +$ $H_{i-1}T_{(i+1,m+1)}'G^*_{(i,m)}' +$ $H_{i-1}G^*_{(i,m)}'PS_{(m+1,z)}'.$

23. The adder in accordance with claim 20 wherein a recursive SUM equation, $SUM_{i-1}$, obeys the following Boolean expression:

$SUM_{i-1} = M_{i-1}G^*_{(i,m)} + M_{i-1}T_{(i+1,m+1)}G^*_{(m+1,z)} +$ $M_{i-1}T_{(i+1,z+1)}PS_{(z+1,k)} +$ $H_{i-1}T_{(i+1,m+1)}'G^*_{(i,m)}' +$ $H_{i-1}G^*_{(i,m)}'T_{(m+2,z+1)}'G^*_{(m+1,z)}' +$ $H_{1-1}G^*_{(i,m)}'G^*_{(m+1,z)}'PS_{(z+1,k)}'.$

24. The adder in accordance with claim 21 comprising a critical SUM equation implementing the following Boolean expression for $i = 0$ :

$SUM_{(i)} = M_{(i)}G^*_{(i+1,9)} + Q_{(i,5)}R_{(6,15)} +$ $Q_{(i,5)}T_{(6,12)}W_{(13,21)} +$ $Q_{(i,5)}T_{(6,22)}PS_{(22,29)} +$ $H_{(i)}T_{(i+2,10)}'G^*_{(i+1,9)}' +$ $X_{(i,9)}Z_{(11,15)} +$ $X_{(i,9)}G^*_{(10,15)}'L_{(16,22)} +$ $X_{(i,9)}Y_{(10,21)}PS_{(22,29)}'$ with:

$Q_{(i,5)} = M_{(i)}T_{(i+2,5)}$ $R_{(6,15)} = T_{(6,10)}G^*_{(10,15)}$ $W_{(13,21)} = T_{(13,16)}G^*_{(16,21)}$ $X_{(i,9)} = H_{(i)}G^*_{(i+1,9)}'$ $Z_{(11,15)} = T_{(11,16)}'G^*_{(10,15)}'$ $L_{(16,22)} = G^*_{(16,21)}'T_{(17,22)}'$ $Y_{(10,21)} = G^*_{(10,15)}'G^*_{(16,21)}'.$

25. The adder in accordance with claim 22 comprising a critical SUM equation implementing the following Boolean expression for i=0:

$$SUM_{(i)} = M_{(i)}G^*_{(i+1,9)} + Q_{(i,5)}R_{(6,15)} +$$

$$Q_{(i,5)}T_{(6,12)}W_{(13,21)} +$$

$$Q_{(i,5)}T_{(6,22)}PS_{(22,29)} +$$

$$H_{(i)}T_{(i+2,10)}'G^*_{(i+1,9)}' +$$

$$X_{(i,9)}Z_{(11,15)} +$$

$$X_{(i,9)}G^*_{(10,15)}'L_{(16,22)} +$$

$$X_{(i,9)}Y_{(10,21)}PS_{(22,29)}'$$

with:

$$Q_{(i,5)} = M_{(i)}T_{(i+2,5)}$$

$$R_{(6,15)} = T_{(6,10)}G^*_{(10,15)}$$

$$W_{(13,21)} = T_{(13,16)}G^*_{(16,21)}$$

$$X_{(i,9)} = H_{(i)}G^*_{(i+1,9)}'$$

$$Z_{(11,15)} = T_{(11,16)}'G^*_{(10,15)}'$$

$$L_{(16,22)} = G^*_{(16,21)}'T_{(17,22)}'$$

$$Y_{(10,21)} = G^*_{(10,15)}'G^*_{(16,21)}'.$$

26. The adder in accordance with claim 23 comprising a critical SUM equation implementing the following Boolean expression for i=0:

$$SUM_{(i)} = M_{(i)}G^*_{(i+1,9)} + Q_{(i,5)}R_{(6,15)} +$$

$$Q_{(i,5)}T_{(6,12)}W_{(13,21)} +$$

$$Q_{(i,5)}T_{(6,22)}PS_{(22,29)} +$$

$$H_{(i)}T_{(i+2,10)}'G^*_{(i+1,9)}' +$$

$$X_{(i,9)}Z_{(11,15)} +$$

$$X_{(i,9)}G^*_{(10,15)}'L_{(16,22)} +$$

$$X_{(i,9)}Y_{(10,21)}PS_{(22,29)}'$$

with:

$$Q_{(i,5)} = M_{(i)}T_{(i+2,5)}$$

$$R_{(6,15)} = T_{(6,10)}G^*_{(10,15)}$$

$$W_{(13,21)} = T_{(13,16)}G^*_{(16,21)}$$

$$X_{(i,9)} = H_{(i)}G^*_{(i+1,9)}'$$

$$Z_{(11,15)} = T_{(11,16)}'G^*_{(10,15)}'$$

$$L_{(16,22)} = G^*_{(16,21)}'T_{(17,22)}'$$

$$Y_{(10,21)} = G^*_{(10,15)}'G^*_{(16,21)}'.$$

27. The adder in accordance with claim 24 comprising a critical SUM equation for any of the bits 1-31 properly extending from said i=0 critical SUM equation and in accordance with said recursive SUM equations.

28. The adder in accordance with claim 25 comprising a critical SUM equation for any of the bits 1-31 properly extending from said i=0 critical SUM equation and in accordance with said recursive SUM equations.

29. The adder in accordance with claim 26 comprising a critical SUM equation for any of the bits 1-31 properly extending from said i=0 critical SUM equation and in accordance with said recursive SUM equations.

30. The adder in accordance with claim 27 wherein pseudo quantities and their complements obey the following Boolean expression for i=0:

$$G^*_{(i+1,9)} = G^*_{(i+1,3)} + T_{(i+2,4)}G^*_{(4,6)} + T_{(i+2,4)}T_{(5,7)}G^*_{(7,9)}$$

$$G^*_{(i+1,9)}' = (G^*_{(i+1,3)} + T_{(i+2,4)}G^*_{(4,6)} + T_{(i+2,4)}T_{(5,7)}G^*_{(7,9)})'.$$

31. The adder in accordance with claim 28 wherein pseudo quantities and their complements obey the following Boolean expression for i=0:

$$G^*_{(i+1,9)} = G^*_{(i+1,3)} + T_{(i+2,4)}G^*_{(4,6)} +$$

$$T_{(i+2,4)}T_{(5,7)}G^*_{(7,9)}$$

$$G^*_{(i+1,9)}' = (G^*_{(i+1,3)} + T_{(i+2,4)}G^*_{(4,6)} +$$

$$T_{(i+2,4)}T_{(5,7)}G^*_{(7,9)})'.$$

32. The adder in accordance with claim 29 wherein pseudo quantities and their complements obey the following Boolean expression for i=0:

$$G^*_{(i+1,9)} = G^*_{(i+1,3)} + T_{(i+2,4)}G^*_{(4,6)} +$$

$$T_{(i+2,4)}T_{(5,7)}G^*_{(7,9)}$$

$$G^*_{(i+1,9)}' = (G^*_{(i+1,3)} + T_{(i+2,4)}G^*_{(4,6)} +$$

$$T_{(i+2,4)}T_{(5,7)}G^*_{(7,9)})'.$$

33. The adder in accordance with claim 30 wherein auxiliary functions are defined by the following Boolean expressions:

$$Q_{(i,5)} = H_{(i)}'T_{(i+1)}T_{(i+2,5)} + H_{(i)}T_{(i+1)}'T_{(i+2,5)}$$

$$R_{(6,15)} = T_{(6,10)}G^*_{(10,15)} = T_{(6,9)}T_{(10)}G^*_{(10,12)} +$$

$$T_{(6,9)}T_{(10,13)}G^*_{(13,15)}$$

$$W_{(13,21)} = T_{(13,16)}G^*_{(16,21)} = T_{(13,16)}G^*_{(16,18)} +$$

$$T_{(13,16)}G^*_{(17,19)}G^*_{(19,21)}$$

$$X_{(i,9)} = (H_{(i)}' + G^*_{(i+1,i+3)} +$$

$$T_{(i+2,i+4)}G^*_{(i+4,i+6)} +$$

$$T_{(i+2,i+4)}T_{(i+5,i+7)}G^*_{(i+7,9)})'$$

$$Z_{(11,15)} = (T_{(11,13)}T_{(14,16)} + G^*_{(10,12)} +$$

$$T_{(11,13)}G^*_{(13,15)})'$$

$$L_{(16,22)} = (G^*_{(16,18)} + T_{(17,19)}G^*_{(19,21)} +$$

$$T_{(17,20)}T_{(21,22)})'$$

$$Y_{(10,21)}=(G^*_{(10,12)}+T_{(11,13)}G^*_{(13,15)}+$$
$$G^*_{(16,18)}+T_{(17,19)}G^*_{(19,21)})'.$$

34. The adder in accordance with claim 31 wherein auxiliary functions are defined by the following Boolean expressions:

$$Q_{(i,5)}=H_{(i)}'T_{(i+1)}T_{(i+2,5)}+H_{(i)}T_{(i+1)}'T_{(i+2,5)}$$
$$R_{(6,15)}=T_{(6,10)}G^*_{(10,15)}=T_{(6,9)}T_{(10)}G^*_{(10,12)}+$$
$$T_{(6,9)}T_{(10,13)}G^*_{(13,15)}$$
$$W_{(13,21)}=T_{(13,16)}G^*_{(16,21)}=T_{(13,16)}G^*_{(16,18)}+$$
$$T_{(13,16)}G^*_{(17,19)}G^*_{(19,21)}$$
$$X_{(i,9)}=(H_{(i)}'+G^*_{(i+1,i+3)}+$$
$$T_{(i+2,i+4)}G^*_{(i+4,i+6)}+$$
$$T_{(i+2,i+4)}T_{(i+5,i+7)}G^*_{(i+7,9)})'$$
$$Z_{(11,15)}=(T_{(11,13)}T_{(14,16)}+G^*_{(10,12)}+$$
$$T_{(11,13)}G^*_{(13,15)})'$$
$$L_{(16,22)}=(G^*_{(16,18)}+T_{(17,19)}G^*_{(19,21)}+$$
$$T_{(17,20)}T_{(21,22)})'$$
$$Y_{(10,21)}=(G^*_{(10,12)}+T_{(11,13)}G^*_{(13,15)}+$$
$$G^*_{(16,18)}+T_{(17,19)}G^*_{(19,21)})'.$$

35. The adder in accordance with claim 32 wherein auxiliary functions are defined by the following Boolean expressions:

$$Q_{(i,5)}=H_{(i)}'T_{(i+1)}T_{(i+2,5)}+H_{(i)}T_{(i+1)}'T_{(i+2,5)}$$
$$R_{(6,15)}=T_{(6,10)}G^*_{(10,15)}=T_{(6,9)}T_{(10)}G^*_{(10,12)}+$$
$$T_{(6,9)}T_{(10,13)}G^*_{(13,15)}$$
$$W_{(13,21)}=T_{(13,16)}G^*_{(16,21)}=T_{(13,16)}G^*_{(16,18)}+$$
$$T_{(13,16)}G^*_{(17,19)}G^*_{(19,21)}$$
$$X_{(i,9)}=(H_{(i)}'+G^*_{(i+1,i+3)}+$$
$$T_{(i+2,i+4)}G^*_{(i+4,i+6)}+$$
$$T_{(i+2,i+4)}T_{(i+5,i+7)}G^*_{(i+7,9)})'$$
$$Z_{(11,15)}=(T_{(11,13)}T_{(14,16)}+G^*_{(10,12)}+$$
$$T_{(11,13)}G^*_{(13,15)})'$$
$$L_{(16,22)}=(G^*_{(16,18)}+T_{(17,19)}G^*_{(19,21)}+$$
$$T_{(17,20)}T_{(21,22)})'$$
$$Y_{(10,21)}=(G^*_{(10,12)}+T_{(11,13)}G^*_{(13,15)}+$$
$$G^*_{(16,18)}+T_{(17,19)}G^*_{(19,21)})'.$$

36. The adder in accordance with claim 33 wherein a new-carry equation for bit 22 and its complement are defined by the following Boolean expressions:

$$PS_{(22,29)}=G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)}$$
$$PS_{(22,29)}'=(G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)})'.$$

37. The adder in accordance with claim 34 wherein a new-carry equation for bit 22 and its complement are defined by the following Boolean expressions:

$$PS_{(22,29)}=G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)}$$
$$PS_{(22,29)}'=(G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)})'.$$

38. The adder in accordance with claim 35 wherein a new-carry equation for bit 22 and its complement are defined by the following Boolean expressions:

$$PS_{(22,29)}=G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)}$$
$$PS_{(22,29)}'=(G^*_{(22,24)}+T_{(23,25)}G^*_{(25,27)}+$$
$$T_{(23,25)}T_{(26,28)}G^*_{(28,29)}+$$
$$T_{(23,26)}T_{(27,30)}PS_{(30)})'.$$

39. The adder in accordance with claim 36 wherein a pseudo transmit signal for bit groups from 1 to 3 is defined by the following Boolean expressions:

$$T_{(i,i+3)}=(A_{(i)}+B_{(i)})(A_{(i+1)}+B_{(i+1)})(A_{(i+2)}+$$
$$B_{(i+2)})(A_{(i+3)}+B_{(i+3)})$$
$$T_{(i)}=A_{(i)}+B_{(i)}$$
$$T_{(i,i+1)}=(A_{(i)}+B_{(i)})(A_{(i+1)}+B_{(i+1)})$$
$$T_{(i,i+2)}=(A_{(i)}+B_{(i)})(A_{(i+1)}+B_{(i+1)})(A_{(i+2)}+$$
$$B_{(i+2)}).$$

40. The adder in accordance with claim 37 wherein a pseudo transmit signal for bit groups from 1 to 3 is defined by the following Boolean expressions:

$$T_{(i,i+3)}=(A_{(i)}+B_{(i)})(A_{(i+1)}+B_{(i+1)})(A_{(i+2)}+$$
$$B_{(i+2)})(A_{(i+3)}+B_{(i+3)})$$
$$T_{(i)}=A_{(i)}+B_{(i)}$$
$$T_{(i,i+1)}=(A_{(i)}+B_{(i)})(A_{(i+1)}+B_{(i+1)})$$
$$T_{(i,i+2)}=(A_{(i)}+B_{(i)})(A_{(i+1)}+B_{(i+1)})(A_{(i+2)}+$$

41. The adder in accordance with claim 38 wherein a pseudo transmit signal for bit groups from 1 to 3 is defined by the following Boolean expressions:

$$T_{(i,i+3)} = (A_{(i)} + B_{(i)})(A_{(i+1)} + B_{(i+1)}(A_{(i+2)} + B_{(i+2)})(A_{(i+3)} + B_{(i+3)})$$

$$T_{(i)} = A_{(i)} + B_{(i)}$$

$$T_{(i,i+1)} = (A_{(i)} + B_{(i)})(A_{(i+1)} + B_{(i+1)})$$

$$T_{(i,i+2)} = (A_{(i)} + B_{(i)})(A_{(i+1)} + B_{(i+1)})(A_{(i+2)} + B_{(i+2)}).$$

42. The adder in accordance with claim 39 wherein a pseudo generate signal for bit groups 1 to 2 is defined by the following Boolean expressions:

$$G^*_{(i)} = A_{(i)}B_{(i)}$$

$$G^*_{(i,i+1)} = A_{(i)}B_{(i)} + A_{(i+1)}B_{(i+1)}$$

$$G^*_{(i,i+2)} = A_{(i)}B_{(i)} + A_{(i+1)}B_{(i+1)} + A_{(i+1)}A_{(i+2)}B_{(i+2)} + B_{(i+1)}A_{(i+2)}B_{(i+2)}.$$

43. The adder in accordance with claim 40 wherein a pseudo generate signal for bit groups 1 to 2 is defined by the following Boolean expressions:

$$G^*_{(i)} = A_{(i)}B_{(i)}$$

$$G^*_{(i,i+1)} = A_{(i)}B_{(i)} + A_{(i+1)}B_{(i+1)}$$

$$G^*_{(i,i+2)} = A_{(i)}B_{(i)} + A_{(i+1)}B_{(i+1)} + A_{(i+1)}A_{(i+2)}B_{(i+2)} + B_{(i+1)}A_{(i+2)}B_{(i+2)}.$$

44. The adder in accordance with claim 41 wherein a pseudo generate signal for bit groups 1 to 2 is defined by the following Boolean expressions:

$$G^*_{(i)} = A_{(i)}B_{(i)}$$

$$G^*_{(i,i+1)} = A_{(i)}B_{(i)} + A_{(i+1)}B_{(i+1)}$$

$$G^*_{(i,i+2)} = A_{(i)}B_{(i)} + A_{(i+1)}B_{(i+1)} + A_{(i+1)}A_{(i+2)}B_{(i+2)} + B_{(i+1)}A_{(i+2)}B_{(i+2)}.$$

45. The adder in accordance with claim 42 wherein a new-carry equation for bit 30 and its complement are defined by the following Boolean expressions:

$$PS_{(30)} = A_{(30)}B_{(30)} + A_{(31)}B_{(31)} + A_{(31)}Cin + B_{(31)}Cin$$

$$PS_{(30)}' = (A_{(30)}B_{(30)} + A_{(31)}B_{(31)} + A_{(31)}Cin + B_{(31)}Cin)'.$$

46. The adder in accordance with claim 43 wherein a new-carry equation for bit 30 and its complement are defined by the following Boolean expressions:

$$PS_{(30)} = A_{(30)}B_{(30)} + A_{(31)}B_{(31)} + A_{(31)}Cin + B_{(31)}Cin$$

$$PS_{(30)}' = (A_{(30)}B_{(30)} + A_{(31)}B_{(31)} + A_{(31)}Cin + B_{(31)}Cin)'.$$

47. The adder in accordance with claim 44 wherein a new-carry equation for bit 30 and its complement are defined by the following Boolean expressions:

$$PS_{(30)} = A_{(30)}B_{(30)} + A_{(31)}B_{(31)} + A_{(31)}Cin + B_{(31)}Cin$$

$$PS_{(30)}' = (A_{(30)}B_{(30)} + A_{(31)}B_{(31)} + A_{(31)}Cin + B_{(31)}Cin)'.$$

48. In a computer, an improved high speed adder with multiple logic stages for adding two operands each having a predetermined length of 32 bits, including first stage logic circuits, intermediate stage logic circuits receiving certain inputs from said first stage logic circuits, and final stage logic circuits receiving certain inputs from said intermediate stage logic circuits, wherein said first stage, intermediate and final stage logic circuits comprise AND-OR books not greater than a size of 3×8 where 3 refers to the maximum number of inputs for each AND gate and 8 refers to the maximum number of AND gates providing inputs to the OR gate.

* * * * *